United States Patent
Verney et al.

(10) Patent No.: US 11,449,843 B1
(45) Date of Patent: Sep. 20, 2022

(54) USING VEHICLE TELEMATICS TO COMPENSATE DRIVERS FOR INCREASES IN FUEL PRICES

(71) Applicant: Allstate Insurance Company, Northbrook, IL (US)

(72) Inventors: Steven Carl Verney, Wadsworth, IL (US); Grady Irey, Des Plaines, IL (US); Frank Kazas, Inverness, IL (US); Edward A. Biemer, Glencoe, IL (US)

(73) Assignee: Allstate Insurance Company, Northbrook, IL (US)

( * ) Notice: Subject to any disclaimer, the term of this patent is extended or adjusted under 35 U.S.C. 154(b) by 240 days.

(21) Appl. No.: 14/598,962

(22) Filed: Jan. 16, 2015

(51) Int. Cl.
  *G06Q 20/10* (2012.01)
  *G06Q 50/06* (2012.01)
  *G06Q 30/02* (2012.01)

(52) U.S. Cl.
  CPC ......... *G06Q 20/10* (2013.01); *G06Q 30/0236* (2013.01); *G06Q 50/06* (2013.01)

(58) Field of Classification Search
  CPC .... G06Q 30/0207; G06Q 50/30; G06Q 40/02; G06Q 30/0261; G06Q 40/08; G07C 5/00; G07C 1/00; H04W 4/24; H04W 4/12; H04M 15/42; B60R 16/0236
  USPC ...................................................... 705/35, 39
  See application file for complete search history.

(56) References Cited

U.S. PATENT DOCUMENTS

| | | | |
|---|---|---|---|
| 7,877,198 B2 * | 1/2011 | Tenzer et al. | 701/123 |
| 8,170,911 B1 | 5/2012 | Pender et al. | |
| 8,457,880 B1 * | 6/2013 | Malalur | G01C 21/30 701/410 |
| 8,509,987 B2 | 8/2013 | Resner | |
| 8,731,768 B2 * | 5/2014 | Fernandes | G08G 5/0039 701/32.3 |
| 8,731,974 B2 | 5/2014 | Pandhi et al. | |

(Continued)

FOREIGN PATENT DOCUMENTS

| | | | |
|---|---|---|---|
| EP | 24442281 B1 | 11/2013 | |
| WO | WO-2010014965 A2 * | 2/2010 | G06Q 30/02 |

OTHER PUBLICATIONS

Firms' tracking helps companies keep on truckin'. (Enterprise: Wireless) Graves, Brad. San Diego Business Journal23.19: 1(3). CBJ, L.P. (May 13, 2002).*

(Continued)

*Primary Examiner* — Richard C Weisberger
(74) *Attorney, Agent, or Firm* — Polsinelli PC

(57) ABSTRACT

Aspects of the present disclosure are directed toward systems and methods for using vehicle telematics information to compensate individuals for increases in fuel prices above a guaranteed fuel price. The approaches described herein compensate the individuals based on the difference between a guaranteed fuel price and a comparison fuel price for a coverage period, the distance traveled during the coverage period, and the estimated fuel economy of the vehicle type. A baseline fuel price is determined and used to set a guaranteed price for a coverage period. During the coverage period, a telematics device collects telematics information associated with trips taken in a vehicle. That telematics information is then stored at a data store and used to compensate an individual associated with the vehicle when fuel prices rise during the coverage period to exceed the guaranteed fuel price.

18 Claims, 8 Drawing Sheets

(56) References Cited

U.S. PATENT DOCUMENTS

| | | | |
|---|---|---|---|
| 8,805,707 B2 | 8/2014 | Schumann et al. | |
| 9,278,015 B2* | 3/2016 | Hilaire | A61F 2/856 |
| 2003/0065630 A1* | 4/2003 | Brown | G07F 7/08 |
| | | | 705/413 |
| 2009/0210257 A1 | 8/2009 | Chalfant et al. | |
| 2009/0222338 A1 | 9/2009 | Hamilton, II et al. | |
| 2010/0217535 A1* | 8/2010 | Seidel | G06Q 50/06 |
| | | | 702/24 |
| 2011/0040579 A1 | 2/2011 | Havens | |
| 2011/0106370 A1 | 5/2011 | Duddle et al. | |
| 2012/0296727 A1 | 11/2012 | Gore et al. | |
| 2013/0041621 A1* | 2/2013 | Smith | B60W 50/14 |
| | | | 702/142 |
| 2013/0085819 A1 | 4/2013 | Gore et al. | |
| 2014/0032062 A1 | 1/2014 | Baer et al. | |
| 2014/0136242 A1* | 5/2014 | Weekes | G06Q 40/08 |
| | | | 705/4 |
| 2014/0195272 A1 | 7/2014 | Sadiq et al. | |
| 2015/0052987 A1* | 2/2015 | Jung | G07C 5/00 |
| | | | 73/114.53 |

OTHER PUBLICATIONS

IT on Wheel by: Schwartz, Ephraim. InfoWorld. Nov. 17, 2003, vol. 25 Issue 45, p. 63-68. 4p. 1 Chart. , Database: Computer Source.*

GM: Fleets could benefit from telematics service. By: Sawyers, Arlena, Automotive News, 00051551, May 24, 2004, vol. 78, Issue 6094 Business Source Complet.*

Telematics set the stage for Improved Autoclaiims Management 2012.*

"Study of the Impact of a Telematics System on Safe and Fuel-efficient Driving in Trucks." U.S. Department of Transportation. Apr. 2014.

"Fuel Rewards." Discovery. 2014.

"AA Research: Standard Metrics for Transport and Driver Safety and Fuel Economy." Frith et al. Nov. 2012.

"Green Driving." Green Insurance Company Ltd. Retrieved from [https://www.greeninsurancecompany.co.uk/greenIssue/greenDriving.html#step3] on Oct. 17, 2014.

"Green Driver State Incentives in Georgia." DMV.org. Retrieved from [http://www.dmv.org/ga-georgia/green-driver-state-incentives.php] on Oct. 17, 2014.

* cited by examiner

202

| customer_id | first_name | last_name | address | phone number | email |
|---|---|---|---|---|---|
| 22400 | First Name 1 | Last Name 1 | 123 Main Street, Anytown, USA | 123-555-0001 | email_1@... |
| 22401 | First Name 2 | Last Name 2 | 125 Main Street, Anytown, USA | 123-555-0002 | email_2@... |
| 22402 | First Name 3 | Last Name 3 | 127 Main Street, Anytown, USA | 123-555-0003 | email_3@... |
| 22403 | First Name 4 | Last Name 4 | 129 Main Street, Anytown, USA | 123-555-0004 | email_4@... |
| 22404 | First Name 5 | Last Name 5 | 131 Main Street, Anytown, USA | 123-555-0005 | email_5@... |

| policy_id | customer_id | start date | end date | type | premium | guaranteed gas price |
|---|---|---|---|---|---|---|
| 11380 | 22400 | 2/24/2000 | 2/24/2001 | liability | $100 | $1.11/gal. |
| 11381 | 22401 | 2/26/2000 | 2/26/2001 | collision | $100 | $2.22/gal. |
| 11382 | 22402 | 8/26/2000 | 8/26/2001 | comprehensive | $100 | $3.33/gal. |
| 11383 | 22403 | 1/2/2000 | 1/2/2001 | personal injury | $100 | $4.44/gal. |
| 11384 | 22404 | 9/3/2000 | 9/3/2001 | un/under-insured | $100 | $5.55/gal. |

| vehicle id | customer id | make | model | year | estimated city usage | estimated highway usage |
|---|---|---|---|---|---|---|
| 404 | 22400 | Make A | Model Z | 1999 | 45% | 55% |
| 678 | 22401 | Make B | Model Z | 2000 | 50% | 50% |
| 770 | 22402 | Make C | Model Y | 2001 | 55% | 45% |
| 312 | 22403 | Make D | Model Y | 2002 | 60% | 40% |
| 847 | 22404 | Make E | Model X | 2003 | 65% | 35% |

FIG. 2D

| make | model | year | overall estimated fuel economy | estimated city fuel economy | estimated highway fuel economy |
|---|---|---|---|---|---|
| Make A | Model Z | 1999 | 30 mpg | 25 mpg | 33 mpg |
| Make B | Model Z | 2000 | 31 mpg | 26 mpg | 34 mpg |
| Make C | Model Y | 2001 | 32 mpg | 27 mpg | 35 mpg |
| Make D | Model Y | 2002 | 33 mpg | 28 mpg | 36 mpg |
| Make E | Model X | 2003 | 34 mpg | 29 mpg | 37 mpg |

| trip id | vehicle id | start date | start time | end date | end time | total miles | fuel-based miles | non-fuel-based miles |
|---|---|---|---|---|---|---|---|---|
| 1001 | 22400 | 9/3/2000 | 6:00 AM | 9/3/2000 | 7:05 AM | 30 mi. | 30 mi. | 0 mi. |
| 1002 | 22400 | 9/4/2000 | 6:05 AM | 9/3/2000 | 7:10 AM | 33 mi. | 33 mi. | 0 mi. |
| 1003 | 22400 | 9/5/2000 | 6:10 AM | 9/3/2000 | 7:15 AM | 35 mi. | 35 mi. | 0 mi. |
| 1004 | 22401 | 10/1/2000 | 9:00 PM | 10/2/2000 | 1:30 AM | 200 mi. | 25 mi. | 175 mi. |
| 1005 | 22402 | 10/2/2000 | 9:45 PM | 10/3/2000 | 2:30 AM | 225 mi. | 100 mi. | 125 mi. |

| | miles above score threshold | miles below score threshold | actual fuel usage | actual fuel economy | fast acceleration event count | avg. acceleration event rate |
|---|---|---|---|---|---|---|
| A | 30 mi. | 0 mi. | 1.1 gal. | 27.3 mpg | 0 | 3/min. |
| | 28 mi. | 5 mi. | 1.2 gal. | 27.5 mpg | 2 | 4/min. |
| | 25 mi. | 10 mi. | 1.3 gal. | 26.9 mpg | 3 | 5/min. |
| | 180 mi. | 20 mi. | 0.7 gal. | 35.7 mpg | 5 | 2/min. |
| | 215 mi. | 10 mi. | 3.0 gal. | 33.3 mpg | 7 | 1/min. |

FIG. 2E

| id | vehicle id | coverage period start date | coverage period end date | compensation date | total compensated miles | estimated fuel economy | adjusted estimated fuel economy |
|---|---|---|---|---|---|---|---|
| 213 | 215 | 217 | 219 | 221 | 223 | 225 | 227 |
| 997 | 22400 | 1/1/2010 | 12/31/2010 | 1/1/2011 | 1138 | 29 mpg | 25 mpg |
| 8011 | 22400 | 1/1/2011 | 12/31/2011 | 1/1/2012 | 2240 | 33 mpg | 30 mpg |
| 404 | 22400 | 1/1/2012 | 12/31/2012 | 1/1/2013 | 7777 | 25 mpg | 25 mpg |
| 294 | 22401 | 7/1/2013 | 12/31/2014 | 1/1/2015 | 8502 | 29 mpg | 27 mpg |
| 9177 | 22402 | 1/1/2012 | 12/31/2014 | 1/1/2015 | 960 | 24 mpg | 29 mpg |

(A)

| actual fuel economy | total fast acceleration event count | average acceleration event rate | average fuel price | guaranteed fuel price | compensation type | compensation amount |
|---|---|---|---|---|---|---|
| 229 | 231 | 233 | 235 | 237 | 239 | 241 |
| 25 mpg | 244 | 12 events/min. | $3.17/gal. | $3.00/gal. | cash | $22.40 |
| 31 mpg | 77 | 7 events/min. | $3.22/gal. | $3.00/gal. | cash | $28.91 |
| 27 mpg | 0 | 3 events/min. | $4.05/gal. | $3.00/gal. | gift card | $94.91 |
| 28 mpg | 24 | 3 events/min. | $4.24/gal. | $3.25/gal. | premium | $35.91 |
| 28 mpg | 3 | 2 events/min. | $2.88/gal. | $2.75/gal. | cash | $9.30 |

FIG. 2F

USING VEHICLE TELEMATICS TO COMPENSATE DRIVERS FOR INCREASES IN FUEL PRICES

BACKGROUND

Fuel and energy prices are prone to constant fluctuation. This constant fluctuation of prices may thus be a source of anxiety for individuals and entities that need to budget their fuel and energy expenditures. Previous attempts to reduce fuel-related and energy-related anxiety resulting from increases in fuel and energy prices might only consider the actual expenditures of the individuals. These previous approaches, however, might not provide incentives to increase fuel and energy efficiency.

SUMMARY

The following presents a simplified summary of the present disclosure in order to provide a basic understanding of some aspects of the disclosure. This summary is not an extensive overview of the disclosure. It is not intended to identify key or critical elements or to delineate the scope of the claimed subject matter. The following summary merely presents some concepts of the disclosure in a simplified form as a prelude to the more detailed description provided below.

Aspects of the present disclosure are directed toward systems and methods for using vehicle telematics information to compensate individuals for increases in fuel prices above a guaranteed fuel price. The approaches described herein compensate the individuals based on the difference between a guaranteed fuel price and a comparison fuel price observed during a coverage period, the distance traveled during the coverage period, and the estimated fuel economy of the vehicle type.

A fuel price for a baseline time period is determined and used to set a guaranteed price for a coverage period. During the coverage period, a telematics device collects telematics information associated with trips taken in a vehicle. That telematics information is then stored at a data store and used to compensate an individual associated with the vehicle when fuel prices rise during the coverage period to exceed the guaranteed fuel price.

Some example embodiments may include one or more of the following features. The compensation may be delivered as an electronic payment to a financial account of an individual associated with the vehicle. The guaranteed fuel price may be determined based on a fuel price associated with a time period that precedes the coverage period. The fuel price may be an average fuel price associated with a geographic area such as a zip code. The telematics information may also include an actual fuel economy achieved by the vehicle during the coverage period. An average actual fuel economy for the vehicle during the coverage period may be determined as well as a surplus compensation amount based on the average actual fuel economy. The surplus compensation amount may be based on the difference between the guaranteed fuel price and the comparison fuel price for the coverage period, the total distance traveled during the coverage period, and the difference between the estimated fuel economy of the vehicle and the average actual fuel economy achieved during the coverage period.

A notification indicating the compensation amount and the surplus compensation amount may be transmitted to a computing device operated by an individual associated with the vehicle. The notification may also include a set of options for accepting delivery of the compensation amount. A response may be received indicating which option has been selected, and delivery of the compensation amount may be initiated based on the selected option. If the selected option is a credit toward an insurance policy premium, the compensation amount may be doubled (subject to any applicable rebate laws in the jurisdiction where the compensation is provided). The telematics information may also include one or more vehicle operation scores. Individual vehicle operation scores may be associated with individual portions of the distance traveled by the vehicle during the coverage period.

The compensation amount may be determined using only those portions of the distance traveled that are associated with a vehicle operation score above a score threshold. The distance traveled may be measured by miles, and the estimated fuel economy may include an estimated urban fuel economy and an estimated highway fuel economy. The distance traveled may also be the aggregate distance traveled by the vehicle during multiple trips taken in the vehicle during the coverage period. A total number of urban miles driven by the vehicle during the coverage period may be determined based on an urban usage percentage associated with the vehicle. A total number of highway miles driven by the vehicle during the coverage period may be determined based on a highway usage percentage associated with the vehicle. The compensation amount may thus be determined based on the total number of urban miles and highway miles driven by the vehicle and the estimated urban and highway fuel economies of the vehicle. The estimated fuel economy of a vehicle may be based on one or more actual fuel economies received from one or more other vehicles of the same vehicle type. The estimated fuel economy may also be adjusted based on an analysis of the telematics information and in response to determining that an individual engaged in fuel-inefficient vehicle operation behaviors during the coverage period.

The details of these and other embodiments of the disclosure are set forth in the accompanying drawings and description below. Other features and advantages of aspects of the disclosure will be apparent from the description, drawings, and claims.

BRIEF DESCRIPTION OF THE DRAWINGS

Some features herein are illustrated by way of example, and not by way of limitation, in the figures of the accompanying drawings and in which like reference numerals refer to similar elements.

FIG. 2A is an example of an implementation of a customer table of a database in accordance with aspects of the present disclosure.

FIG. 2B is an example of an implementation of an insurance policy table of a database in accordance with aspects of the present disclosure.

FIG. 2C is an example of an implementation of a vehicle table in accordance with aspects of the present disclosure.

FIG. 2D is an example of an implementation of an estimated fuel economy table in accordance with aspects of the present disclosure.

FIG. 2E is an example of an implementation of a vehicle telematics table in accordance with aspects of the present disclosure.

FIG. 2F is an example of an implementation of a compensation table in accordance with aspects of the present disclosure.

DETAILED DESCRIPTION

Figure 1:
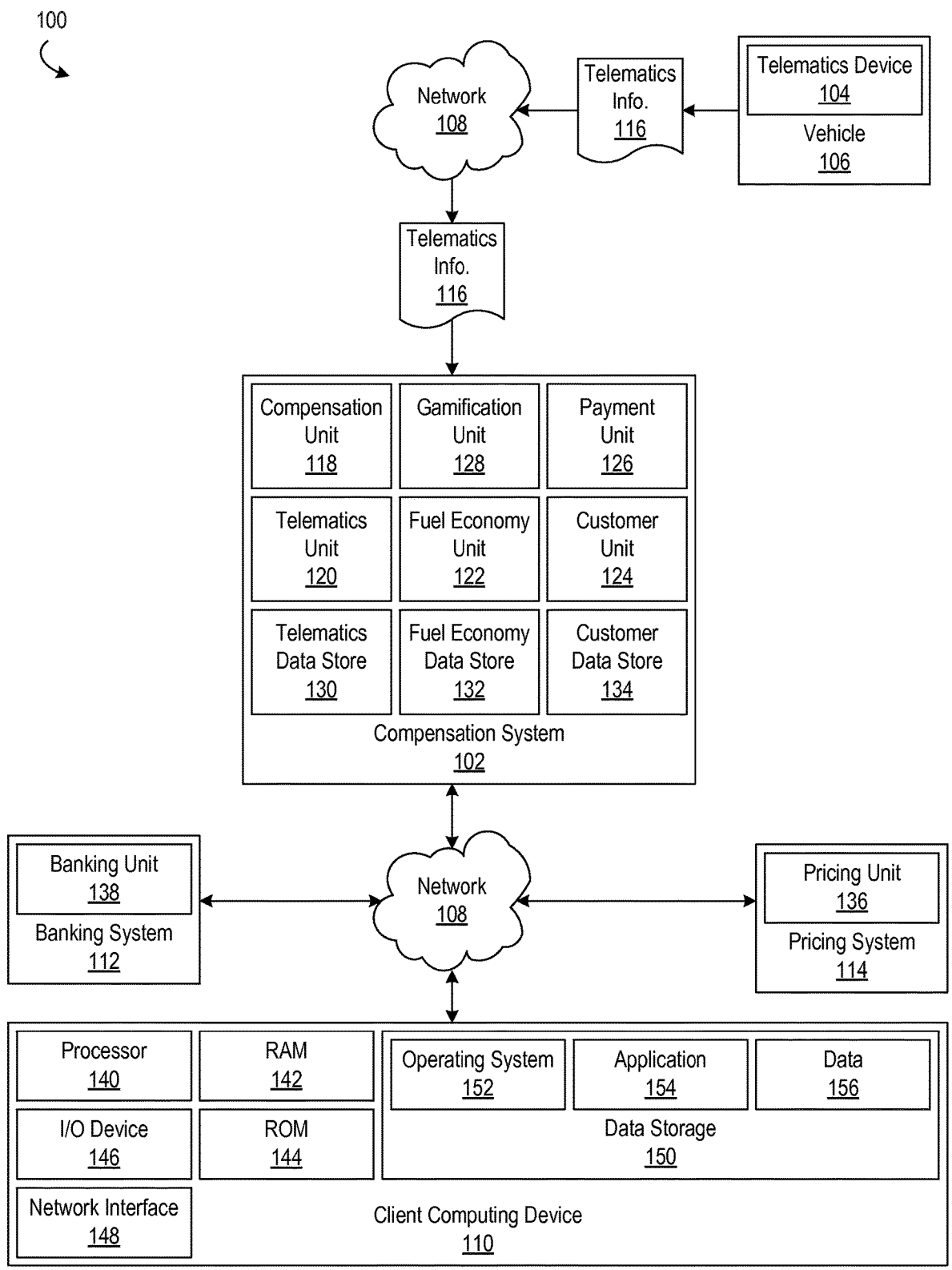
FIG. 1 is an example of an implementation of a system that facilitates compensating drivers for increases in fuel prices using vehicle telematics in accordance with aspects of the present disclosure.

Aspects of the present disclosure are directed toward systems and methods for using vehicle telematics information to compensate individuals for increases in fuel prices above a guaranteed fuel price. The approaches described herein compensate the individuals based on the difference between a guaranteed fuel price and a comparison fuel price observed during a coverage period, the distance traveled during the coverage period, and the estimated fuel economy of the vehicle type. As described in further detail below, the comparison fuel price may be based on an average fuel price observed during the coverage period or a snapshot fuel price observed during the coverage period, e.g., at the end of the coverage period. By compensating individuals based on the estimated fuel economy of the vehicle rather than the actual fuel economy achieved, the individuals are motivated to derive additional benefits from the compensation received by employing fuel-efficient vehicle operation behaviors.

Approaches described in further detail below are provided in the context of automobile vehicles and the drivers of those automobiles. The techniques provided, however, are similarly applicable to other types of vehicles.

To illustrate the advantages of the approaches described herein, consider, for example, that the guaranteed fuel price is set at $3.00/gallon (gal.) for the current coverage period and that the driver has driven 500 miles (mi.) during the coverage period. If the estimated fuel economy of the vehicle is 25 miles per gallon (mpg), then the estimated fuel usage for the coverage period is 20 gallons (500 mi.÷25 mpg=20 gal.). If the average fuel price during the coverage period rose to $4.00/gallon, then the estimated fuel outlay during the coverage period is $80.00 ($4.00/gal.×20 gal.=$80.00). The guaranteed fuel outlay, however, is $60.00 due to the guaranteed fuel price of $3.00/gal. ($3.00/gal.×20 gal.=$60.00). The difference between the guaranteed fuel price and the average fuel price during the coverage period is $1.00/gal. ($4.00−$3.00=$1.00). Accordingly, the driver may be compensated $20.00 due to the increase in the average fuel price during the coverage period ($80.00−$60.00=$20.00 and 20 gal.×$1.00/gal.=$20.00).

Since the compensation amount is based on the estimated fuel economy, however, the compensation amount does not depend on the actual fuel economy achieved during the coverage period. As a result, the driver has the opportunity to derive two additional benefits by increasing the actual fuel economy during the coverage period by engaging in fuel-efficient driving behaviors. The first additional benefit is the unused fuel the driver retains that was estimated to have been used based on the estimated fuel economy of the vehicle. If, through fuel-efficient driving behaviors, the driver can increase the actual fuel economy of the vehicle to 40 mpg, in this example, then the actual fuel usage during the coverage period would be 12.5 gal. (500 mi.÷40 mpg=12.5 gal.) as compared to the 20 gal. estimated to have been used based on an estimated fuel economy of 25 mpg. The driver thus retains 7.5 gal. that were estimated to have been used during the coverage period. In other words, the driver, in this example, is compensated as if 20 gal. of fuel were consumed during the coverage period even though only 12.5 gal. were actually consumed. As noted below, the unused fuel retained is referred to in this description as surplus fuel.

In view of the unused fuel retained, the second additional benefit is the compensation amount received above the actual fuel outlay resulting from the increase of the average fuel price during the coverage period. Continuing the example above, the actual fuel expenditure for the coverage period would be $50.00 (12.5 gal.×$4.00/gal.). At a guaranteed fuel price of $3.50/gal., however, the guaranteed fuel outlay would have been $37.50 (12.5 gal.×$3.50/gal.). Accordingly, the difference between the actual fuel outlay and the guaranteed fuel outlay is $12.50 ($50.00−$37.50=$12.50). The driver, in this example, thus receives an extra $7.50 above what would have been spent on fuel ($20.00−$12.50=$7.50) by increasing the actual fuel economy of the vehicle by engaging in fuel-efficient driving behaviors during the coverage period. The extra compensation received is referred to in this description as the surplus compensation amount.

The driver may further increase the amount of surplus fuel and the amount of surplus compensation by further increasing the fuel economy of the vehicle. As described in further detail below, deriving these additional benefits may be gamified by creating competitions among drivers to determine who can derive the most benefits by increasing actual fuel economies through fuel-efficient driving behaviors. Vehicle telematics information is used to determine the compensation amounts provided to the drivers due to increases in fuel prices above a guaranteed fuel price.

For convenience, the following terminology is adopted in the present disclosure. Fuel prices refer to a commodity price of fuel—the price at which fuel is traded in commodities markets—as well as a consumer (i.e., retail) price of fuel—the price at which fuel is purchased by consumers. A comparison fuel price refers to a fuel price compared to another fuel price. As an example a guaranteed fuel price may be compared to a comparison price associated with a coverage period to determine whether to comparison price for that coverage period is higher than the guaranteed fuel price. A comparison price may be a snapshot of a current fuel price and thus may be referred to as a snapshot fuel price. The snapshot fuel price may be associated with a particular day and time of the coverage period, e.g., noon on the first day of the coverage period, noon on the last day of the coverage period. A snapshot fuel price may also be associated with a specified or randomly selected day and time of the coverage period.

A comparison price may also be an average fuel price. Average fuel price refers to the average of multiple fuel prices. An average fuel price may be associated with a particular predetermined period of time, e.g., a coverage period. The average fuel price may be a national average or an average for a selected geographic area. The predetermined time period may be x number of days, weeks, months, quarters, years, and other units of time. The predetermined time period may also be a date range having a start date and an end date. Baseline period refers to the time period for which a fuel price is determined for and then used to set a guaranteed fuel price. Baseline fuel price refers to the fuel price determined for the baseline period and used to set the guaranteed fuel price. The guaranteed fuel price may equal to the baseline fuel price. The baseline fuel price may also serve as a starting point for determining the guaranteed fuel price in which case the guaranteed fuel price is based on the baseline fuel price. Guaranteed fuel price refers to a set fuel price for which compensation will be provided if a higher comparison fuel price occurs during a coverage period. Coverage period refers to a time period during which the guaranteed fuel price is in effect. The coverage period may likewise be x number of days, weeks, months, quarters, years, and other time units, and may also be a date range having a start date and an end date.

Fuel economy refers to the fuel efficiency relationship between the distance traveled and the amount fuel consumed by the vehicle while traversing that distance. Estimated fuel economy refers to an anticipated fuel economy of a vehicle having a particular make, model, and year. The estimated fuel economy is thus the same for all vehicles having a common make, a common model, and a common year. The estimated fuel economy may be determined through simulated driving tests or from an analysis of information identifying the actual fuel economies of multiple vehicles of the same vehicle type. The estimated fuel economy may also be obtained from manufacturer specifications or third-parties that perform fuel economy tests and validations. Actual fuel economy refers to the actual fuel economy of the vehicle during one or more trips. The actual fuel economy of a vehicle may be for one trip taken in the vehicle or an average of the actual fuel economies of the vehicle across multiple trips.

Estimated fuel usage refers to an amount of fuel the vehicle is anticipated to consume based on the estimated fuel economy of the vehicle and a distance traveled. Actual fuel usage refers to an amount of fuel actually consumed by the vehicle during one or more trips. The actual fuel usage may be the actual fuel consumed during one trip or an aggregate amount of fuel consumed by the vehicle during multiple trips. Fuel usage may be measured in units of gallons, liters, and other measures of volume. Estimated fuel outlay refers to an anticipated monetary amount spent on fuel for a particular time period based on the estimated fuel economy of a vehicle, a distance traveled by the vehicle during the time period, and a comparison fuel price for the time period. Actual fuel outlay refers to the monetary amount actually spent on fuel for a particular time period based on the actual fuel economy of the vehicle during the time period, the distance traveled by the vehicle during the time period, and a comparison fuel price for the time period. Guaranteed fuel outlay refers to a monetary amount spent on fuel for a particular time period based on the estimated fuel economy of the vehicle, the distance traveled by the vehicle during the time period, and a guaranteed fuel price set for the time period.

Compensation amount refers to a monetary amount corresponding to the difference between a guaranteed fuel outlay for a coverage period and an actual fuel outlay for a coverage period. Surplus compensation amount refers to the portion of the compensation amount that exceeds the amount a driver should be compensated for due to an increase in a comparison fuel price during a coverage period above the guaranteed fuel price set for the coverage period. As described in further detail below, a compensation amount may include a surplus compensation amount when the actual fuel economy achieved during a coverage period exceeds the estimated fuel economy used to determine the compensation amount. Surplus fuel refers to an amount of unused fuel retained by the vehicle during a time period that is expected to have been used based on the estimated fuel economy of the vehicle and a distance traveled by the vehicle during the time period. As also described below, surplus fuel may also result when the actual fuel economy achieved during the time period exceeds the estimated fuel economy of the vehicle. The surplus compensation amount and the surplus fuel may thus be described as a "bonus" resulting from increasing the fuel economy of a vehicle. Finally a set, as used in this description, refers to a collection of one or more elements.

Referring now to FIG. 1, a system 100 that facilitates compensating drivers for increase in fuel prices using vehicle telematics is shown. The system 100, in this example, includes a compensation system 102 in signal communication with a telematics device 104 residing in a vehicle 106 via a network 108. The compensation system 102 is also in signal communication with a client computing device 110, a banking system 112, and a pricing system 114 via a network 108.

As described in further detail below, the telematics device 104 is configured to monitor driving behaviors during operation of the vehicle 106 and transmit, to the compensation system 102, telematics information 116 describing the operation of the vehicle and the corresponding driving behaviors. The compensation system 102 is configured to determine whether a driver should be compensated for increases in fuel prices above a guaranteed fuel price based, at least in part, on the telematics information 116 received from the telematics device 104. The pricing system 114 provides historical fuel price information, and the compensation system 102 queries the pricing system for fuel price information associated with a particular time period in order to determine whether fuel prices increased above a guaranteed fuel price during that time period. If the compensation system 102 determines that a driver should be compensated for an increase in fuel prices above a guaranteed fuel price, then the compensation system 102 may initiate a payment to the driver via the banking system 112. The client computing device 110 may be associated with the driver, and the compensation system 102 may exchange communications with a client computing device to provide information and notifications regarding compensation for an increase in fuel prices above a guaranteed fuel price for the driver.

The telematics device 104, in this example, is configured to reside in the vehicle 106 and monitor driving behaviors during operation of the vehicle. The telematics device 104, in this example, is configured to determine when a driver is operating the vehicle, collect information regarding the operation of the vehicle, and transmit that information to the compensation system 102 as the telematics information 116. The telematics device 104 may be configured to transmit the telematics information 116 to the compensation system 102 at regular periodic intervals, whenever the vehicle comes to a complete stop (such as at a stop light, stop sign, or parking space), or when the vehicle is shut off. The telematics device 104 may be configured to transmit the telematics information 116 via the network 108 which may include transmitting the telematics information via a cellular network, a wide area network such as the Internet, or a combination of such networks.

In some example implementations, the telematics device 104 is configured to attach to the on-board diagnostics (OBD) port of the vehicle 106 to collect diagnostic information generated by the various sub-systems of the vehicle. The telematics device 104 may include a subset of the diagnostic information collected via the OBD port in the telematics information transmitted to the compensation system 102. In other example implementations, the telematics device 104 may be a special-purpose mobile computing device that the driver brings into the vehicle 106 and resides in the vehicle during operation of the vehicle. The driver may then remove this special-purpose mobile computing device at the end of a trip. In still other example implementations, a device may attach to the OBD port of the vehicle 106 and transmit the diagnostic information collected to a special-purpose mobile computing device residing in the vehicle which, in turn, transmits the telematics information 116 to the compensation system 102. In further example implementations, the telematics device 104 may be installed in the vehicle 106 as one of the sub-systems or components of the vehicle and transmit the telematics information to a special-purpose mobile computing device residing in the vehicle or directly to the compensation system 102.

The telematics device 104 is configured to determine the number of miles traveled during a trip in the vehicle 106. To determine the number of miles traveled, the telematics device 104 may collect diagnostic information from an odometer sub-system of the vehicle 106 via the OBD port. The telematics device 104 may also include a Global Positioning System (GPS) unit and determine the number of miles traveled based on changes of the geographic location of the vehicle during a trip. The telematics device 104 may also include an accelerometer used to detect and log acceleration and deceleration events that occur during a trip in the vehicle. The telematics device 104 may also be configured to identify which of the acceleration events are "fast" acceleration events, which may occur when the driver accelerates at or above a preset acceleration threshold, e.g., at or above 10 miles per hour per second (mph/s). The telematics device 104 may include information regarding acceleration and "fast" acceleration events in the telematics information 116. As described in further detail below, the compensation unit 118 of the compensation system 102 may consider information related to acceleration events when determining a compensation amount to provide to the driver.

Additional details regarding telematics devices that may be suitable for use in collecting and transmitting telematics information are described in commonly-owned U.S. Pat. No. 8,799,034 to Brandmaier et al. entitled "Automated Accident Detection, Fault Attribution, and Claims Processing" which issued on Aug. 5, 2014 and which is incorporated by reference herein in its entirety.

The telematics device 104 may also be configured to facilitate generation of a vehicle operation score for a trip taken in the vehicle. For automobiles, the vehicle operation score may be a driving score. The driving score may be a numeric driving score (e.g., 1-100) or an alphabetic driving score (e.g., A-F). Based on an analysis of diagnostic information collected from the vehicle 106 (e.g., the condition of various vehicle components and sub-systems) and vehicle operation information collected during the operation of the vehicle (e.g., speed, acceleration, braking, and turning), a driving score may be generated and aggregated with other driving scores for other trips taken in the vehicle to obtain an overall driving score for the driver. As described in further detail below, the compensation system 118 may be configured to consider the driving score a driver achieves during the coverage period when determining the compensation amount for that coverage period. Furthermore multiple driving scores may be generated for each portion of a trip where, for example, each portion is defined by a range of miles traveled during the trip—e.g., miles 1-10 receive a score of 8.5/10, miles 11-15 receive a score of 9.0/10, and miles 16-35 receive a score of 9.5/10 resulting in a weighted average driving score of about 9.1 for the trip. As also described in further detail below, the compensation provided to a driver for an increase in fuel prices above a guaranteed fuel price may depend on a comparison of one or more vehicle operation scores (e.g., driving scores) generated during the coverage period to a vehicle operation score threshold (e.g., a driving score threshold).

In some example implementations, the telematics device 104 itself is configured to analyze the diagnostic and vehicle operation information to generate the driving score. In these example implementations, the telematics device 104 may include the driving score or scores in the telematics information 116 transmitted to the compensation system 102. In other example implementations, the compensation system 102 may include a driving analysis unit (not shown) that analyzes the telematics information 116 received from the telematics device 104 in order to generate the driving score or scores. In still other example implementations, the telematics device 104 may transmit the telematics information 116 to a driving analysis system (not shown) that is in signal communication with the compensation system. The driving analysis system, in this example, would be configured to analyze the telematics information 116 received from the telematics device 104, generate one or more driving scores based on the telematics information received, and transmit the driving score or scores to the compensation system 102.

Additional details regarding the generation of driving scores based on the operation of a vehicle are described in commonly-owned U.S. Pat. No. 8,751,563 to Warden et al. entitled "Geotribing" which issued on Jun. 10, 2014 and in commonly owned U.S. patent application Ser. No. 14/087,961 to Phelan et al. which published on Mar. 27, 2014 as U.S. Patent Application Publication No. 2014/0087335 entitled "Motor Vehicle Operating Data Collection and Analysis," each of which are incorporated by reference herein in their entirety.

The telematics information 116 may include information regarding the vehicle ("diagnostic information") as well as the operation of the vehicle ("operation information"). The diagnostic information refers to information indicating the identity, status, and condition of the vehicle, its sub-systems, and its components. Examples of diagnostic information that may be considered by the compensation system 102 include: the vehicle make, model, and year; actual fuel economy achieved during a trip; vehicle speed; engine revolutions per minute (RPM); trip start date and start time; trip end date and end time; miles traveled during a trip; use of electric or electronic accessories in the vehicle; tire pressure; and other types of diagnostic information suitable for assessing actions or conditions that could affect the fuel economy of the vehicle 106. The operation information refers to information indicating the driving behaviors the driver exhibits during operation of the vehicle including behaviors related to speed, acceleration, braking, and turning. Examples of operation information that may be considered by the compensation system 102 include: a count of "fast" acceleration events; a measure of the average rate of acceleration events per minute (events/min.); and other driving behaviors that could affect the fuel economy of the vehicle 106.

For vehicles powered by both fuel-based energy sources and non-fuel-based energy sources (e.g., hybrid vehicles), the telematics information 116 may distinguish between miles traveled using the fuel-based energy source and the non-fuel-based energy source. For telematics devices configured to generate one or more driver scores, the telematics information 116 may additionally indicate the number of miles traveled at or above a preset score threshold and the number of miles traveled below that preset score threshold. For vehicles powered by fuel-based and non-fuel-based energy sources, the telematics information 116 may indicate the number of fuel-based miles traveled at/above or below the preset score threshold. As described in further detail below, the compensation system 102 may consider the fuel-based miles traveled when determining the compensation amount provided to a driver.

The compensation system 102 is configured to provide drivers with compensation for increases in fuel prices above a guaranteed fuel price using vehicle telematics data. As noted above, the compensation system 102 is configured to determine the compensation amount based on the estimated fuel economy of the type of vehicle driven rather than an actual fuel economy achieved by the vehicle. The compensation system 102, in this example, includes a compensation unit 118, a telematics unit 120, a fuel economy unit 122, a customer unit 124, a payment unit 126, and a gamification unit 128. The compensation system 102, in this example, also includes a telematics data store 130, a fuel economy data store 132, and a customer data store 134. Each of these components is described in further detail below.

In some example implementations, the compensation system 102 is a special-purpose computing device programmed with instructions that, when executed, perform functions associated with using vehicle telematics to compensate drivers for increases in fuel prices above a guaranteed fuel price. In these example implementations, the units 118-128 of the compensation system 102 correspond to particular sets of instructions embodied as software programs residing at the compensation system.

In other example implementations, the compensation system 102 is a collection of special-purpose computing devices that are interconnected and in signal communication with each other. In these example implementations, each unit 118-128 of the compensation system 102 respectively corresponds to a special-purpose computing device programmed with a particular set of instructions that, when executed, perform respective functions associated with using vehicle telematics to compensate drivers for increases in fuel prices. Such special-purpose computing devices may be, for example, application servers programmed to perform the particular set of functions.

Although the units 118-128 of the compensation system 102 in FIG. 1 are illustrated as individual units, some example implementations of a compensation system may include special-purpose computing devices that are programmed with multiple sets of instructions that each correspond to one of the units 118-128. As an example, an implementation of a compensation system may include a first special-purpose computing device programmed with a first set of instructions that corresponds to the compensation unit 118, a second set of instructions that corresponds to the telematics unit 120, and a third set of instructions that corresponds to the fuel economy unit 122. The compensation system, in this alternative example, may also include a second special-purpose computing device programmed with a set of instructions corresponding to the customer unit 124, and a set of instructions corresponding to the payment unit 126. The compensation system, in this alternative example, may further include a third special-purpose computing device programmed with a set of instructions corresponding to the gamification unit. Additional and alternative examples of possible implementations and configurations for the compensation system will be appreciated with the benefit of this disclosure and may be selectively employed without departing from the scope of the claimed subject matter.

The compensation unit 118, in this example, is configured to facilitate setting a guaranteed fuel price, determining whether a driver is eligible to receive compensation for an increase in the comparison fuel price above that guaranteed fuel price during a coverage period, and compensating the driver accordingly.

To determine the guaranteed fuel price for a particular coverage period, the compensation unit 118, in this example, is configured to determine the comparison fuel price during a time period that precedes the coverage period. The preceding time period and the coverage period may be a fixed time period (e.g., 6 months). The preceding time period and the coverage period may be the same or different lengths of time. For example, the preceding period may be, e.g., 6 months, while the coverage period is e.g., 12 months. The preceding time period may also depend on the length of the coverage period. As noted above, a guaranteed fuel price may be provided as a feature of an insurance policy. Accordingly, the length of the preceding time period may equal the term of the insurance policy. In addition, the driver may negotiate the length of the coverage period. In some example implementations, an insurance company may provide the guaranteed fuel price as a reward for safe driving behaviors or as a reward for a low number of claims (e.g., 0-2) filed during a policy term. Although the guaranteed fuel price may be provided as a feature of an insurance policy, it need not be. Other implementations of the compensation system may provide the guaranteed fuel price as an independent program or service or as a feature associated with other goods or services.

The compensation system 102, in this example, determines a comparison fuel price for the preceding time period by exchanging communications with the pricing system 114. The pricing system 114, as seen in FIG. 1, is located remotely relative to the compensation system 102. The pricing system 114 may be a freely-available or commercially-available pricing system that provides historical fuel price data. One example of a suitable pricing system is provided by the U.S. Energy Information Administration (EIA) which provides weekly retail gasoline and diesel prices.

The compensation system 102 may, for example, submit a query to the pricing system 114 and receive pricing data in response. The query may specify the date range for the requested pricing data (e.g., starting 6 months before the start of the coverage period and ending the day before the start of the coverage period) in order to receive an average fuel price for that date range. The average fuel price may be based on a snapshot fuel price observed for each of the days in the date range. The query may also specify a number of days of the date range on which to base the average fuel price for the date range. As an alternative the query may specify multiple dates or multiple dates and times in order to receive an average fuel price. As another alternative, the query may specify a day or a day and time for the requested pricing data in order to receive a snapshot fuel price for that day or day and time. Additional examples will be appreciated with the benefit of this disclosure.

The comparison fuel price determined by the compensation system 102 may be a nationwide average fuel price, a statewide average fuel, a citywide average fuel price, or a comparison fuel price associated with some other type of geographic area. In some example implementations, for example, the compensation system 102 determines the average fuel price within a geographic area defined by the address at which the vehicle is registered, e.g., a geographic area defined by the zip code of the vehicle registration address or a geographic area defined by a preset radius (such as 25 miles) around the vehicle registration address. In some example implementations, the geographic area may be defined by the zip code of the vehicle registration address as well as one or more zip codes contiguous with that address. Accordingly, the query to the pricing system 114 may also include geographic information (e.g., a state name, city name, a zip code, or an address with corresponding radius). Upon receipt of the fuel price query, the pricing unit 136 of the pricing system 114 may perform a lookup in a data store of historical fuel prices based on the criteria specified in the query and transmit the result back to the compensation system 102.

The comparison fuel price may depend on the type of vehicle driven by the driver for which a guaranteed fuel price has been set. For example the comparison fuel price may be a comparison gasoline price or a comparison diesel price. In some example implementations, the comparison gasoline price may be the price of midrange-grade gasoline for the relevant period. The comparison fuel price may alternatively be the price of regular-grade gasoline, the price of midrange-grade gasoline, the price of premium-grade gasoline for the relevant period. In some example implementations, the comparison price may be equal to or based on a commodity price at which gasoline is traded in a commodities market. As an example, the comparison price may be equal to or based on a snapshot or an average of the NYMEX RBOB Gasoline Physical Futures Quotes (New York Mercantile Exchange Reformulated Blendstock for Oxygenate Blending).

The fuel price received from the pricing system 114 for a preceding time period may be utilized as the baseline fuel price for setting the guaranteed fuel price. Upon receipt of the baseline fuel price for the preceding period, the compensation system 102 may set and store a guaranteed fuel price for the driver. The guaranteed fuel price may be equal to the baseline fuel price or based on the baseline fuel price. For example, the driver may negotiate a guaranteed fuel price lower than the baseline fuel price received from the pricing system 114. The guaranteed fuel price may also be within a certain percentage (e.g., 5% or 10%) above or below the baseline fuel price received from the pricing system 114 where the percentage may be selected based on various criteria associated with the driver such as, e.g., policy renewal rates, safe driving behaviors, a low number of filed claims, and so forth.

The compensation unit 118, in this example, is also configured to determine the comparison fuel price for the coverage period and compare it to the guaranteed fuel price. The compensation unit 118 may determine the comparison fuel price for the coverage period in the same fashion as the baseline fuel price for the preceding period. In particular, the compensation unit 118 may submit a query to the pricing system 114 that specifies a date or date range (e.g., starting on the first day of the coverage period and ending on the last day of the coverage period) and a geographic area for which the comparison fuel price is requested. In some example implementations, the comparison fuel price compared to the guaranteed fuel price may be an average NYMEX RBOB gasoline futures quote for the coverage period or a snapshot NYMEX RBOB gasoline futures quote on the last day of the coverage period.

The compensation unit 118, in this example, is further configured to determine a compensation amount for the driver when the comparison fuel price for the coverage period exceeds the guaranteed fuel price set for the driver. As described in further detail below, the compensation unit 118 determines the compensation amount based on the telematics information 116 and the estimated fuel economy of the vehicle 106. As also described in further detail below, the compensation unit 118 may then initiate a payment to the driver using the payment unit 126.

The telematics unit 120, in this example, is configured to facilitate receipt, storage, and retrieval of the telematics information 116. Accordingly the telematics unit 120 may serve as a gateway for the telematics device 104 to the compensation system 102. The telematics unit 120 may parse the telematics information 116 upon receipt in preparation for storage at the telematics data store 130. The telematics data store 130 may be implemented as a relational database that stores records corresponding to the telematics data. The telematics unit 120 may create a new record for each transmission of telematics information 116 received from the telematics device 104. In some example implementations, the telematics unit 120 may be in signal communication with the compensation unit 118 and retrieve stored telematics information from the telematics data store 130 in response to receipt of requests from the compensation unit. The telematics unit 120 may query the telematics data store 130 on behalf of the compensation unit 118 using criteria specified by the compensation unit in the request. Such criteria may include, for example, a customer identifier and a date range. The telematics unit 120 may then query the telematics data store 130 for stored telematics information associated with the specified customer within the specified date range and return the results to the compensation unit 118. As described in further detail below, the compensation unit 118 may determine the compensation amount using the results of the query. In other example implementations, the compensation unit 118 may be configured to query the telematics data store 130 directly rather than submit a request to the telematics unit 120.

The fuel economy unit 122, in this example, is configured to facilitate determining the estimated fuel economy based on a vehicle type. The vehicle type of a vehicle, in this example, is defined by the make, model, and year of the vehicle. The fuel economy data store 132, in this example, stores records of vehicle fuel economies. Accordingly, the fuel economy unit 122 may be configured to create and store new fuel economy records at the fuel economy data store 132 as well as retrieve fuel economy information from the fuel economy records stored at the fuel economy data store. In some example implementations, the fuel economy unit 122 may likewise be in signal communication with the compensation unit 118 and retrieve stored fuel economy information from the fuel economy data store 132 in response to receipt of requests from the compensation unit. The fuel economy unit 122 may query the fuel economy data store 132 on behalf of the compensation unit 118 using criteria specified by the compensation unit in the request. Such criteria may include, for example, the make, model, and year of the vehicle. The fuel economy unit 122 may then query the fuel economy data store 132 for stored estimated fuel economy information matching the vehicle make, model, and year and return the results to the compensation unit. As also described in further detail below, the compensation unit 118 may determine the compensation amount using the results of the query.

In other example implementations, the compensation unit 118 may be configured to query the fuel economy data store 132 directly rather than submit a request to the fuel economy unit 122. In further example implementations, a fuel economy data store may be located remotely relative to the compensation system 102, e.g., at a remotely-located third party fuel economy system (not shown) at which resides the remotely-located fuel economy data store and a remotely-located fuel economy unit (not shown). The compensation unit 118 or the fuel economy unit 122, in these other example implementations, may thus submit requests to the remotely-located third-party fuel economy system via the network 108.

The fuel economy information stored in the fuel economy records of the fuel economy data store 132 may include one or more estimated fuel economies for a vehicle type. In some example implementations, the fuel economy information for a vehicle type includes only include an overall estimated fuel economy for that vehicle type. The overall estimated fuel economy for a vehicle type may be based on, for example, the EPA fuel economy specifications for vehicle types. In other example implementations, the fuel economy information for a vehicle type includes the overall estimated fuel economy for that vehicle type as well as an estimated urban fuel economy and an estimated highway fuel economy for the vehicle type. The compensation unit 118 may include the fuel economy type as criteria in a request to the fuel economy unit 122 or third-party fuel economy system or in a query to the fuel economy data store 132.

The fuel economy information may be expressed in various ways including units of fuel per fixed distance and units of distance per fixed fuel unit. In various example implementations, the estimated fuel economy for a vehicle type may be expressed as one or more of miles per gallon (mpg), kilometers per liter (km/L), or liters per 100 kilometers (L/100 km). Gallons may be either US or Imperial gallons. The compensation unit 118 may include the fuel economy unit of measure as criteria in a request to the fuel economy unit 122 or third-party fuel economy system or in a query to the fuel economy data store 132.

In some example implementations, the compensation system may determine the estimated fuel economy of a vehicle based on an analysis of the actual fuel economies respectively reported in the vehicle telematics data collected from multiple vehicles. In these example implementations, the compensation system may collect vehicle telematics data containing actual fuel economy information over a period of time (e.g., a number of years). Once the compensation system has collected an amount of actual fuel economy information, the compensation system may average the respective actual fuel economies to obtain an estimated fuel economy for a vehicle make, model, and year. In this regard, the estimated fuel economy may be crowdsourced based on the actual fuel economies reported in the vehicle telematics data and stored at a vehicle telematics data store.

The customer unit 124, in this example, is configured to facilitate maintenance of customer information associated with customers a guaranteed fuel price has been set for. The customer data store 134, in this example, stores records of customer information. Accordingly, the customer unit 124 may be configured to create and store new customer records at the customer data store 134 as well as retrieve customer information from the customer records stored at the customer data store. In some example implementations, the customer unit 124 may likewise be in signal communication with the compensation unit 118 and retrieve stored customer information from the customer data store 134 in response to receipt of requests from the compensation unit. The customer unit 124 may query the customer data store 134 on behalf of the compensation unit 118 using criteria specified by the compensation unit in the request. Such criteria may include, for example, a unique customer identifier such as a customer number. The customer unit 124 may then query the customer data store 134 for stored customer information matching the specified criteria and return the results to the compensation unit. The compensation unit 118 may then determine the compensation amount for the customer corresponding to the retrieved customer information.

In other example implementations, the compensation unit 118 may be configured to query the customer data store 134 directly rather than submit a request to the customer unit 124. In further example implementations, a customer data store may be located remotely relative to the compensation system 102, e.g., at a remotely-located third party system (not shown)—such as an insurance system—at which resides the remotely-located customer data store and a remotely-located customer unit (not shown). The compensation unit 118, in these other example implementations, may thus submit requests to the remotely-located third-party system via the network 108 to retrieve customer information. The customer may be the driver of the vehicle 106, the owner of the vehicle (i.e., the individual the vehicle is registered to), or another individual that is associated with the vehicle (e.g., an individual that has permission to operate the vehicle).

The customer unit 124, in this example, is also configured to provide notifications via the network 108 to the client computing device 110. The notifications may be, for example, electronic mail (email) messages as well as text messages. The notifications may be, for example, notifications indicating a compensation amount that will be or has been paid to the individual, notifications indicating an actual fuel economy achieved by the individual during a trip relative to the estimated fuel economy for the vehicle, notifications identifying fuel-efficient or fuel-inefficient driving behaviors that might respectively increase or decrease the actual fuel economy of the vehicle, and other types of notifications that will be appreciated with the benefit of this disclosure.

The payment unit 126, in this example, is configured to facilitate a payment to an individual associated with the vehicle corresponding to the compensation amount. The compensation unit 118, in this example, is in signal communication with the payment unit 126 and provides the compensation amount to the payment unit 126. In some example implementations, the compensation unit 118 also provides the payment unit 126 the financial information needed to execute the payment transaction (e.g., the name of the financial institution and a financial account number). In other example implementations, the compensation unit 118 may provide the payment unit 126 with customer information (e.g., a unique customer identifier), and the payment unit may perform a lookup (e.g., in the customer data store 134) using the customer information to retrieve the financial information needed to execute the payment transaction. The payment unit 126, in this example, is also in signal communication with the banking unit 138 of the banking system 112 via the network 108. The payment unit 126 thus submits a request to the banking unit 138 to execute the payment transaction. The request to the banking unit 138 includes the payment amount (which may equal or be based on the compensation amount) as well as the customer or financial information needed to execute the payment transaction.

In some example implementations, the payment unit may be configured to initiate generation a physical check to be mailed to the individual. In these example implementations, the payment unit is in signal communication with a printer (not shown) that prints a physical check that is then mailed to the individual.

The compensation system 102 may also be configured to provide compensation to the individual in a form other than a cash payment. As noted above, the guaranteed fuel price may be provided to an insurance customer as a feature of an insurance policy. In these example implementations, the compensation system 102 may increase the compensation amount if the insurance customer agrees to apply the compensation amount to an insurance policy premium of a renewed insurance policy. For example, the compensation unit 118 may double the compensation amount if accepted as a credit toward an insurance policy premium of an insurance policy. Other percentages (e.g., 10%, 25%, 50%, 75%, and so on) may be selectively employed to increase the compensation amount. In other example implementations, the entity that operates the compensation system 102 may partner with third-party vendors that offer a credit for goods or services based on the compensation amount. As an example, the individual may have the option to accept the compensation in the form of a gift card having a value based on the compensation amount (e.g., a gift card having a value equal to the compensation amount or a value equal to the compensation amount plus x %).

The compensation unit 118 of the compensation system 102 may thus also be configured to notify the individual of the compensation amount determined and present the individual with a list of options for accepting delivery of the compensation amount. Continuing the examples above, the list of options may include: i) a cash payment equal to the compensation amount, ii) a credit toward payment of an insurance policy premium equal to double the compensation amount, iii) a gift card to a first third-party vendor equal to the compensation amount plus 20%, and iv) a gift card to a second third party vendor equal to the compensation amount plus 35%. In some example implementations, the compensation options may include vouchers for free goods or services that correlate to the compensation amount, e.g., a free oil change, a free car wash, a free tire rotation, a free meal, free clothing apparel, and the like. Additional and alternative examples of compensation options will be appreciated with the benefit of this disclosure.

The compensation unit 118 may provide the compensation options to the client computing device 110 for presentation to the individual. The individual may select the desired compensation option, and the client computing device 110 may transmit the selection back to the compensation system 102 in a response to the notification. Upon receipt of the selected compensation option, the compensation unit 118 may initiate delivery of the compensation amount according to the option selected, e.g., submitting a payment request to the banking system 112, submitting a request to an insurance system to update an insurance policy record, submitting a request to a third-party vendor system to provide the individual with a voucher (e.g., a physical gift card or an electronic redeemable token such as a barcode), applying a credit toward an insurance policy premium for an insurance policy purchased by the individual, and the like.

The gamification unit 128, in this example, is configured to maintain one or more leaderboards identifying the accumulated compensation earned by individual drivers. The gamification unit 128 is also configured to facilitate the creation of user accounts and contact lists for those user accounts. Using a client computing device 110, a driver may register with the compensation system 102, create a user account, create a contact list, and add other users to those contact lists. Some examples of possible contact lists include a "friends" contact list, a "family" contact list, a "coworker" contact list, and the like. The gamification unit 128 is configured to create a leaderboard identifying the users in a selected contact list and information related to the compensation provided to those users. The leaderboard may list the users ordered according to the compensation information respectively associated with each user.

The compensation information included in a leaderboard may include, for example, the total compensation provided to a user to date, the average actual fuel economy achieved by a user, a fuel economy differential achieved by the user, the total surplus compensation earned by the user, and the total surplus fuel retained by the user. The gamification unit 128 is configured to provide leaderboards for a current time period (e.g., the current year) or a user-specified time period. Through gamification, users participating in the fuel price compensation program will be further incentivized to improve the fuel efficiency of their vehicle through competition with the other users.

The gamification unit 128, in this example, is configured to provide user-defined leaderboards based on their contact lists as well as general leaderboards based on various categories. Such categories may include, for example, zip code, city, state, region, and the like. A general leaderboard based on zip codes may, for example, include a list of zip codes ordered according to the average compensation earned by vehicle owners in that zip code, the fuel economy differential achieved by those users, the total surplus fuel compensation earned by those users, or the total surplus fuel retained by those users. In some example implementations, the gamification unit 128 may be configured to require a minimum number of miles driven during a coverage period (e.g., 100 miles) in order for the user to be eligible to appear on a leaderboard. Gamification and leaderboards will be described in further detail below.

The pricing system 114, in this example, includes a pricing unit 136 configured to facilitate retrieval of historic fuel prices. The pricing system 114 is remotely located relative to the compensation system 102. As noted above, the pricing system 114 may be a third-party pricing system that provides historical fuel price information such as, for example, the system maintained by the EIA that provides historical fuel prices. As described above, the pricing system 114, in this example, receives a request for historical fuel prices that specifies a desired time period. The request may specify the desired time period as a date range or as a length of time relative to the current date (e.g., the previous 6 months, the previous 12 months, and so forth). The request may also indicate a geographic area to retrieve historical fuel prices for. In other example implementations, the entity that provides the compensation system may also provide the pricing system. In these other example implementations, the pricing system may be a part of the compensation system, and the entity may maintain its own historical fuel price data.

The banking system 112, in this example, includes a banking unit 138 configured to facilitate a payment to an individual that should be compensated due to an increase in fuel prices above a guaranteed fuel price. As described above, the banking system 112, in this example, receives a request to execute a payment transaction. The request identifies the payment amount and the customer or financial information needed to execute the payment. Upon successful execution of the payment, the banking unit 138 may transmit an notification back to the compensation system 102 acknowledging that the payment has been made. As noted above, the compensation system 102 may in turn transmit a notification to the client computing device 110 also indicating that a payment has been made to the individual as compensation for an increase in fuel prices above the guaranteed fuel price set for the individual.

The client computing device 110, in this example, is configured to exchange communications with the compensation system 102 and present, to a user, information regarding compensation for increases in fuel prices. Such communications may include notifications of compensation earned by the user or other users resulting from an increase in fuel prices above a guaranteed fuel price during a coverage period, notifications of payments made to the user for compensation earned, prompts for selecting a preferred method of receiving compensation earned, and other types of communications that will be appreciated with the benefit of this disclosure.

The client computing device 110, in this example, includes one or more processors 140, RAM 142, ROM 144, one or more input/output (I/O) devices 146, one or more network interfaces 148, and data storage 150 at which resides an operating system 152, one or more applications 154, and date 156. The client computing device may be, for example, a desktop computer, a laptop computer, a tablet computer, a palmtop computer, a mobile telephone, a television settop box, a network-enabled television, a network-enabled video game machine, and other types of computing devices configured to exchange wired or wireless communications across electric or electronic communication networks. The telematics device 104, the compensation system 102 and its corresponding units 118-128, the pricing system 114 and its corresponding pricing unit 136, and the banking system 112 and its corresponding banking unit 138 may likewise include one or more of respective elements 140-156 of the client computing device 110.

I/O devices 146 may include a microphone, keypad, touch screen, and/or stylus through which a user may provide input to the client computing device 110. I/O devices 146 may also include a speaker for providing audio output and a video display device for providing graphical output. Software may be stored at the data storage 150 or ROM 144 to provide instructions to processor 140 which executes the instructions. The networked environment supports connections between the compensation system 102, the vehicle 106, the client computing device 110, the banking system 112, the pricing system 114, and other systems connected to the network 108. The network 108 may include, for example, one or more of a local area network (LAN) a wide area network (WAN), a wireless telecommunications network, the Internet, and other types of networks that facilitate the exchange of communications between systems and devices. The client computing device 110 may be connected to the network 109 via the network interface 148 which may be, for example, a modem, a network interface card (NIC) or a network adapter. The network interface 148 may be a wired interface, a wireless interface, or both a wired and wireless interface. The network interface 148 may thus include one or more transceivers, digital signal processors, and additional circuitry and software for exchanging wired or wireless communications with other systems and devices via the network. Such communications may be propagated via various network devices such as routers, base transceiver stations, and the like. The client computing device 110 may utilize any of various network protocols such as TCP/IP, Ethernet, FTP, HTTP, and the like as well as any of various wireless communication technologies such as GSM, CDMA, WiFi, and WiMAX.

Referring now to FIGS. 2A-2F, example implementations of database tables that may be employed to facilitate compensation for increases in fuel prices above a guaranteed fuel price are shown. FIG. 2A shows an example of an implementation of a customer table 202. FIG. 2B shows an example implementation of an insurance policy table 204. FIG. 2C shows an example of an implementation of a vehicle table 206. FIG. 2D shows an example of an implementation of an estimated fuel economy table 208. FIG. 2E shows an example of an implementation of a vehicle telematics table 210. FIG. 2F shows an example of an implementation of a compensation table 211. The tables 202-211 may be respectively stored at one or more of the data stores 130-134 shown in FIG. 1. As an example, the customer table 202, the insurance policy table 204, and the vehicle table 206 may reside at the customer data store 134 of the compensation system 102; the estimated fuel economy table 208 may reside at the fuel economy data store 132 of the compensation system; and the vehicle telematics table 210 may reside at the telematics data store 130 of the compensation system. In addition, the columns of the tables 202-210 are shown by way of example only. The tables 202-210 may include additional or alternative columns suitable for providing compensation for increases in fuel prices above a guaranteed fuel price as described herein without departing from the scope of the claimed subject matter. As an example, the tables 202-210 may include columns for primary and foreign keys that are employed to establish relationships between customer records, insurance policy records, vehicle records, estimated fuel economy records, vehicle telematics records, and compensation records. Furthermore, in some example implementations, a customer table, insurance policy table, vehicle table, estimated fuel economy table, and vehicle telematics table may reside at a single data store of a compensation system. Additional and alternative arrangements and configurations of the database tables may be selectively employed without departing from the scope of the claimed subject matter.

The customer table 202, in this example, stores customer records and includes columns for storing information related to customers. Individual customer records stored at the customer table 202 respectively correspond to individual customers. The columns of the customer table 202, in this example, include a column 212 that stores a unique customer identifier for a customer, a column 214 that stores the first name of the customer, a column 216 that stores the last name of the customer, a column 218 that stores the address of the customer, a column 220 that stores the phone number of the customer, and a column 222 that stores the electronic mail (email) address of the customer. Other implementations of a customer table in a compensation system may include additional and alternative columns for storing additional and alternative information related to customers. Furthermore other implementations of the compensation system may include a similar table for storing information associated with individuals in contexts where no business-customer relationship exists (e.g., a person table, a driver table, a vehicle owner table, and the like).

The insurance policy table 204, in this example, stores insurance policy records and includes columns for storing information related to insurance policies. Individual insurance policy records stored at the insurance policy table 204 respectively correspond to individual insurance policies that have been purchased by insurance customers. The columns of the insurance policy table 204, in this example, include a column 224 that stores a unique identifier for an insurance policy, a column 226 that stores a unique identifier for an insurance customer thus establishing a relationship between an insurance policy record and a customer record stored at a customer table (e.g., customer table 202), a column 228 that stores the start date of the insurance policy, a column 230 that stores the end date of the insurance policy, a column 232 that stores the insurance policy type, a column 234 that stores a premium for the insurance policy, and a column 236 that stores a guaranteed fuel price set for the insurance policy.

The vehicle table 206, in this example, stores vehicle records and includes columns for storing information related to vehicles. Individual vehicle records stored at the vehicle table 206 respectively correspond to individual vehicles owned by individual customers. The columns of the vehicle table 206, in this example, include a column 238 that stores a unique identifier for a vehicle, a column 240 that stores a unique identifier for an insurance customer thus establishing a relationship between a vehicle record and a customer record stored at a customer table (e.g., customer table 202), a column 242 that stores the make of the vehicle, a column 244 that stores the model of the vehicle, a column 246 that stores the year of the vehicle, a column 248 that stores an estimated urban usage for the vehicle, and a column 250 that stores an estimated highway usage. A compensation system may utilize the values stored in the columns 242-246 related to the make, model, and year of the vehicle to determine, lookup, or otherwise obtain the estimated fuel economy for the vehicle as described above. As described in further detail below, a compensation system may utilize the values stored in the columns 248-250 related to estimated vehicle usage when estimating the fuel usage and determining a compensation amount for a coverage period. The estimated vehicle usage for a vehicle may be provided by the vehicle owner and stored in the corresponding vehicle record of the vehicle table 206. Additionally or alternatively, a compensation system may store default values for the estimated urban and highway usage (e.g., 60% urban usage and 40% highway usage).

The estimated fuel economy table 208, in this example, stores fuel economy records and includes columns for storing estimated fuel economy information for vehicles. Individual fuel economy records stored at the fuel economy table 208 respectively correspond to individual vehicles uniquely identified by make, model, and year. The columns of the fuel economy table 208, in this example, include a column 252 that stores the make of a vehicle, a column 254 that stores a model of the vehicle, a column 256 that stores the year of the vehicle, a column 258 that stores an overall estimated fuel economy of the vehicle, a column 260 that stores an estimated city fuel economy of the vehicle, and a column 262 that stores an estimated highway fuel economy of the vehicle. Some fuel economy records may only include an overall estimated fuel economy. The vehicle make, model, and year may serve as a unique identifier for the vehicle, and a compensation system may retrieve fuel economy information from the fuel economy table by specifying in a search request an n-tuple (e.g., a 3-tuple) that includes the vehicle make, model, and year.

The vehicle telematics table 210, in this example, stores trip records and includes columns for storing information related to trips taken in a vehicle. The information stored in the telematics table 210 may thus include at least some of the telematics information received from the telematics device at the vehicle. Individual trip records stored at the telematics table 210 respectively correspond to individual vehicles. Since a vehicle may take multiple trips, multiple trip records stored at the telematics table 210 may respectively correspond to the same vehicle. The columns of the telematics table 210, in this example, include a column 264 that stores a unique trip identifier, a column 266 that stores a unique vehicle identifier thus establishing a relationship between a trip record and a vehicle record stored at a vehicle table (e.g., vehicle table 206), a column 268 for storing a start date of the trip, a column 270 for storing a start time of the trip, a column 272 for storing an end date of the trip, a column 274 for storing an end time of the trip, a column 276 for storing a distance traveled during the trip (e.g., the total number of miles or kilometers traveled), a column 278 for storing a total number of fuel-based distance units (e.g., miles) traveled during the trip, a column 280 for storing a total number of non-fuel-based distance units traveled during the trip, a column 282 for storing a total number of fuel-based distance units traveled above a driving score threshold, a column 284 for storing a total number of fuel-based distance units traveled below a driving score threshold, a column 286 for storing an actual fuel usage during the trip, a column 288 for storing an actual fuel economy achieved during the trip, a column 290 for storing a total number of fast acceleration events that occurred during the trip, and a column 292 for storing an average acceleration event rate for the trip (e.g., the average number of acceleration events per minute). As noted above and described in further detail below, a compensation system may utilize the count of fuel-based miles and the count of fuel-based miles above a driving score threshold when determining a compensation amount for a coverage period. As also described in further detail below, a compensation system may adjust the estimated fuel economy used when determining the compensation amount based on the fast acceleration event count and the average acceleration rate.

The compensation table 211, in this example, stores compensation records and includes columns for storing information related to compensation provided in response to increases in fuel prices above a guaranteed price during a coverage period. The columns of the compensation table 211, in this example, include a column 213 that stores a unique identifier for a compensation, a column 215 that stores a unique identifier for the vehicle associated with the compensation record, a column 217 that stores the start date of the corresponding coverage period, a column 219 that stores an end date of the corresponding coverage period, a column 221 that stores a date on which the compensation was provided, a column 223 that stores the total number of compensated distance units (e.g., miles) used to determine the compensation amount, a column 225 that stores the estimated fuel economy used to determine the compensation amount, a column 227 that stores an adjusted fuel economy used to determine the compensation amount, a column 229 that stores an actual fuel economy achieved by the vehicle during the coverage period, a column 231 that stores a total number of fast acceleration events detected during the coverage period, a column 233 that stores an average acceleration event rate detected during the coverage period, and a column 235 that stores the compensation fuel price (e.g., an average fuel price) determined for the coverage period, a column 237 that stores the guaranteed fuel price for the coverage period, and a column 239 that stores an identifier indicating the compensation method (e.g., cash, a credit for a subsequent insurance policy premium, a gift card, and the like), and a column 241 that stores the compensation amount provided. As noted above and described in further detail below, a compensation system may adjust the estimated fuel economy determined for the vehicle based on telematics information that suggests fuel-inefficient driving behaviors. Accordingly, some example implementations of a compensation system may utilize the estimated fuel economy to determine the compensation amount while other implementations may utilize the adjusted fuel economy to determine the compensation amount. The information stored for the compensation records may also be provided to customers or drivers to explain how the compensation amount was determined. For example, a compensation system may provide a customer or driver with a compensation report that includes at least some of the information stored in the compensation record.

Figure 3:
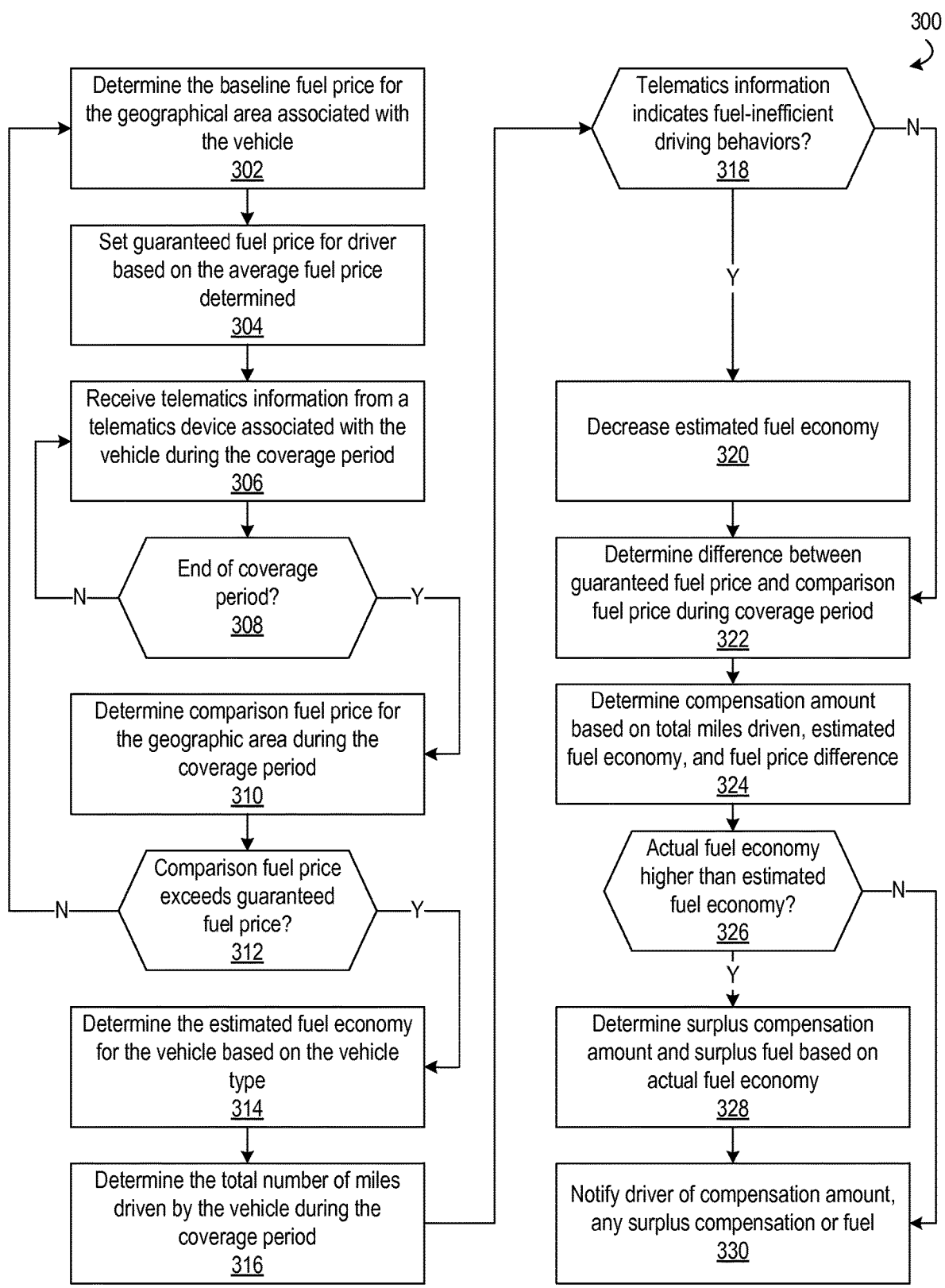
FIG. 3 is of example method steps for using vehicle telematics information to compensate drivers for increases in fuel prices above a guaranteed fuel price in accordance with aspects of the present disclosure.

Referring now to FIG. 3, a flowchart 300 of example method steps for using vehicle telematics information to compensate drivers for increases in fuel prices above a guaranteed fuel price is shown. The steps described below and shown in FIG. 3 are only example steps that a compensation system may employ to provide such compensation. A compensation system may be configured to carry out the compensation process using additional or alternative steps without departing from the scope of the claimed subject matter.

The compensation system, in this example, determines the baseline fuel price for a geographic area associated with a vehicle (block 302) as described above. The baseline fuel price is determined for a time period that precedes the coverage period for which the fuel price is guaranteed. The compensation system sets and stores a guaranteed fuel price based on the baseline fuel price determined (block 304). The guaranteed fuel price may equal the baseline fuel price determined or be higher or lower based on, e.g., negotiations between a vehicle owner (or driver, insurance customer, and the like) and the entity guaranteeing the fuel price. During the coverage period, the compensation system receives telematics information from a telematics device associated with a vehicle (block 306). The compensation system may store at least a portion of the telematics data at a data store for use when determining whether the compensation amount to be provided to the vehicle owner (if any) due to an increase in fuel prices above the guaranteed fuel price during the coverage period. If the coverage period has not yet ended (block 308: N), the compensation system may continue to receive and store telematics information from the telematics device (block 306). Once the coverage period has ended (block 308: Y), however, the compensation system may determine the compensation fuel price for the geographic area associated with the vehicle (block 310), e.g., by querying a pricing system as described above.

If the compensation fuel price for the coverage period did not exceed the guaranteed fuel price (block 312: N), then no compensation would need to be provided to the vehicle owner for that coverage period. The compensation system may set a new guaranteed fuel price for the next coverage period which may equal the guaranteed fuel price set for the coverage period that just ended or the compensation fuel price determined for the coverage period that just ended. The steps above may be thus repeated for the next period to compensate the vehicle owner should fuel prices exceed the new guaranteed fuel price for the new coverage period.

If, however, the compensation fuel price for the coverage period did exceed the guaranteed fuel price (block 312: Y), then the compensation system may determine the estimated fuel economy for the vehicle based on the vehicle type (block 314) as described above. The compensation system may also determine the total number of miles driven by the vehicle during the coverage period (block 316) based on the vehicle telematics data received and stored during the coverage period. As noted above, the total number of miles used to determine the compensation amount may be all miles driven by the vehicle during the coverage period, all fuel-based miles driven by the vehicle during the coverage period, or all fuel-based miles driven by the vehicle during the coverage period that are respectively associated with driving scores above a predetermined score threshold.

In some example implementations, the compensation system may adjust the estimated fuel economy used to determine the compensation amount if the vehicle telematics information indicates a driver engaged in fuel-inefficient driving behaviors during the coverage period. Some examples of fuel-inefficient driving behaviors may include: use of electrical accessories such as the air conditioning unit, radio or other music players, navigation systems, and the like; failing to maintain appropriate tire pressure or wheel alignment; driving at speeds exceeding the optimal speed of the vehicle; frequent idling; frequent short trips; and failing to address maintenance issues. The vehicle telematics information may include telematics information that indicates such behaviors, which may be stored in a telematics data store of the compensation system as described above. Accordingly, the compensation system may adjust the estimated fuel efficiency where, for example, the vehicle telematics information indicates: use of electrical accessories for a predetermined percentage of time during trips taken in the vehicle (e.g., 50% of the time); the tire pressure is below the optimal tire pressure by a predetermined amount (e.g., 5 psi); exceeding the optimal speed of the vehicle by a predetermined amount for a predetermined percentage of time during trips taken in the vehicle (e.g., 5 miles per hour more than 50% of the time); idling for more than a predetermined amount of time (e.g., 7 minutes); a predetermined number of trips taken within a predetermined period of time that are each less than a predetermined distance (e.g., more than 5 trips less than one mile within a one hour time period); and recurrence of OBD codes indicating vehicle maintenance issues that need to be addressed.

The compensation system may analyze the vehicle telematics data to determine whether fuel-inefficient driving behaviors occurred during the coverage period. If the vehicle telematics information indicates that fuel-inefficient driving behaviors occurred (block 318: Y), then the compensation system may decrease the estimated fuel economy (block 320) to obtain an adjusted estimated fuel economy used to determine the compensation amount. The compensation system may be configured to adjust the estimated fuel economy in various ways. In one example, the compensation system may adjust the estimated fuel economy by decreasing the fuel economy by one fuel economy unit (e.g., one mpg) in response to a measure of an inefficient fuel activity above a predetermined measurement threshold (e.g., over 100 fast acceleration events per coverage period, an average accelerating event rate over 3 events per minute during the coverage period, and the like). The compensation system may also be configured to adjust the estimated fuel economy based on a combination of inefficient fuel activities such as those described in the present disclosure. Accordingly additional and alternative examples will be appreciated with the benefit of this disclosure.

The compensation system then determines the difference between the guaranteed fuel price and the compensation fuel price for the coverage period (block 322). Having determined the total number of miles driven during the coverage period, the estimated fuel economy for the vehicle, and the difference between the guaranteed fuel price and the compensation fuel price for the coverage period, the compensation system determines the compensation amount to provide the vehicle owner (block 324).

Implementations of the compensation system may employ various approaches to determine the compensation amount for the vehicle owner. In some example implementations, the compensation system may employ the following equations to determine the compensation amount:

$$G_{est} = M_{tot} \div E_{est} \quad (1)$$

$$P_{dif} = P_{avg} - P_{gtd} \quad (2)$$

$$C_1 = G_{est} \times P_{dif} \quad (3)$$

In equation (1) above, $M_{tot}$ represents the total number of distance units traveled during the coverage period (e.g., 1000 miles), $E_{est}$ represents the estimated fuel economy for the vehicle type (e.g., 25 mpg), and $G_{est}$ represents the estimated gallons consumed during the coverage period (e.g., 40 gallons). In equation (2) above, $P_{avg}$ represents the average fuel price in the geographic area during the coverage period (e.g., $4.00), $P_{gtd}$ represents the guaranteed fuel price (e.g., $3.50), and $P_{dif}$ represents the difference between the average fuel price and the guaranteed fuel price (e.g., $0.50). In equation (3) above, $C_1$ represents the compensation amount (e.g., $20.00) based on the estimated gallons consumed during the coverage period, $G_{est}$, and the difference between the average and guaranteed fuel price, $P_{dif}$.

In other example implementations, the compensation system may utilize the urban and highway usage estimates along with the urban and highway fuel economies to determine the compensation amount. In these other example implementations, the compensation system may employ the following equations to determine the compensation amount:

$$G_{urb} = (M_{tot} \times U_{urb}) \div E_{urb} \quad (4)$$

$$G_{hwy} = (M_{tot} \times U_{hwy}) \div E_{hwy} \quad (5)$$

$$C_2 = (G_{urb} \times P_{dif}) + (G_{hwy} \times P_{dif}) \quad (6)$$

In equation (4) above, $M_{tot}$ represents the total number of distance units traveled during the coverage period (e.g., 1000 miles), $U_{urb}$ represents the estimated usage of the vehicle for urban driving (e.g., 60%), $E_{urb}$ represents the estimated urban fuel economy for the vehicle type (e.g., 27 mpg), and $G_{urb}$ represents the estimated gallons consumed during urban driving throughout the coverage period. In equation (5) above, $M_{tot}$ represents the total number of distance units traveled during the coverage period (e.g., 1000 miles), $U_{hwy}$ represents the estimated usage of the vehicle for highway driving (e.g., 40%), $E_{hwy}$ represents the estimated highway fuel economy for the vehicle type (e.g., 30 mpg), and $G_{hwy}$ represents the estimated gallons consumed during highway driving throughout the coverage period. In equation (6) above, $C_2$ represents the compensation amount based on the estimated gallons consumed during urban driving throughout the coverage period, $G_{urb}$, the estimated gallons consumed during highway driving, $G_{hwy}$, and the difference between the average and guaranteed fuel price, $P_{dif}$.

As noted above, the vehicle telematics data received by the compensation system may include the actual fuel economies respectively achieved by the vehicle during trips taken throughout the coverage period. Accordingly, the compensation system may compare the average actual fuel economy achieved during the coverage period to the estimated fuel economy used to determine the compensation amount. If the average actual fuel economy is higher than the estimated fuel economy (block 326: Y), then the compensation system may determine a surplus compensation amount and a surplus fuel amount based on the difference between the average actual fuel economy and the estimated fuel economy (block 328). The compensation system may then transmit a notification to a client computing device associated with the vehicle owner indicating the compensation amount to be provided as well as any surplus compensation or surplus fuel amount determined (block 330). If the compensation system determines that the actual fuel economy did not exceed the estimated fuel economy utilized to determine the compensation amount (block 328), then the notification may just include the compensation amount to be provided. If the driver has earned a surplus compensation amount or retained a surplus fuel amount, the notification may also include a graphical indicator that illustrates the surplus compensation amount or surplus fuel amount. The steps depicted in the flowchart 300 of FIG. 3 are provided by way of example only. Other implementations may include additional and alternative steps without departing from the scope of the claimed subject matter. As an example, the steps depicted in FIG. 3 determine a baseline fuel price and a compensation fuel price for a geographic area associated with a vehicle. Other implementations, however, may determine the baseline fuel price and the comparison fuel price based on a commodity price for fuel traded in a commodities market as described above which may not be associated with a geographical area. Additional examples will be appreciated with the benefit of this disclosure.

Implementations of the compensation system may employ various approaches to determine the surplus compensation amount and the surplus fuel amount retained by a vehicle owner during a coverage period. In some example implementations, the compensation system may employ the following equations to determine the surplus compensation amount and the surplus fuel amount:

$$G_{act} = M_{tot} \div E_{act} \quad (7)$$

$$O_{act} = G_{act} \times P_{avg} \quad (8)$$

$$O_{gtd} = G_{act} \times P_{gtd} \quad (9)$$

$$S_{cmp} = C_{act} - (O_{act} - O_{gtd}) \quad (10)$$

$$S_{ful} = G_{est} - G_{act} \quad (11)$$

In equation (7) above, $M_{tot}$ represents the total number of distance units traveled during the coverage period (e.g., 1000 miles), $E_{act}$ represents the average actual fuel economy achieved by the vehicle during trips throughout the coverage period (e.g., 32 mpg), and $G_{act}$ represents the total number of gallons consumed by the vehicle during the coverage period (e.g., 31.25 gallons). In equation (8) above, $O_{act}$ represents the fuel outlay of the vehicle owner during the coverage period (e.g., $125.00) based on the total number of gallons of fuel (e.g., 31.25 gallons) consumed by the vehicle during the coverage period, $G_{act}$, and the average price of fuel (e.g., $4.00) during the coverage period, $P_{avg}$. In equation (9) above, $O_{gtd}$ represents the guaranteed fuel outlay (e.g., $109.38) of the vehicle owner based on the total number of gallons of fuel (e.g., 31.25 gallons) consumed by the vehicle during the coverage period and the guaranteed fuel price (e.g., $3.50) for the coverage period. In equation (10) above, $S_{cmp}$ represents the surplus compensation amount (e.g., $4.38) earned by the vehicle owner based on the compensation amount (e.g., $20.00) provided to the vehicle owner, $C_{amt}$, as described above and the difference between the actual fuel outlay (e.g., $125.00) of the vehicle owner, $O_{act}$, and the guaranteed fuel outlay (e.g., $109.38), $O_{gtd}$. In equation (11) above, $S_{ful}$ represents the surplus fuel amount retained by the vehicle owner (e.g., 8.75 gallons) by increasing the average actual fuel economy of the vehicle above its estimated fuel economy during the coverage period. In equation (11) above, the surplus fuel amount, $S_{ful}$, is based on the difference between the estimated gallons of fuel consumed by the vehicle (e.g., 40 gallons) during the coverage period, $G_{est}$, and the actual gallons of fuel consumed by the vehicle (e.g., 31.25 gallons) during the coverage period, $G_{act}$.

In some example implementations, the vehicle telematics data may explicitly indicate the actual fuel usage during a trip which the compensation system may store in the vehicle telematics data store. The compensation system may thus aggregate the amounts of actual fuel usage that occurred during trips throughout the coverage period to determine the actual gallons used during the coverage period, $G_{act}$. Furthermore, in view of the aggregations and averages performed by the compensation system, it will be recognized that the values the compensation system determines for the actual fuel consumption, the actual fuel economy, and the actual fuel outlays might not precisely match the fuel consumed, the fuel economy achieved, or the fuel outlays made during a coverage period.

In some example implementations, the notification may include tips for improving the fuel economy of the vehicle. Such tips may include fuel-efficient driving behaviors and other actions that may improve the fuel economy of a vehicle. Such fuel-efficient driving behaviors may include, e.g., maintaining wheel alignment and optimal tire pressure; minimizing the load carried by the vehicle; maintaining an efficient vehicle speed based on the optimal speed of the vehicle; avoiding frequent accelerations; avoiding fast accelerations; anticipating traffic signals and the movement of traffic to minimize acceleration, braking, and turning; minimizing idling; avoiding frequent short trips; avoiding use of electric accessories; removing exterior accessories and loads that cause drag; using cruise control; promptly addressing vehicle maintenance issues; and other types of behaviors that can affect the fuel economy of the vehicle.

As also noted above, the compensation system may provide the compensation amount to the vehicle owner in various ways, e.g., cash, gift cards, credits toward insurance policy premiums, and the like. The notification may thus also include options for accepting the compensation amount. The notification may prompt the vehicle owner to select the desired compensation method. The compensation system may then receive a communication from the client computing device indicating the compensation method selected by the vehicle owner. If the vehicle owner selects to receive the compensation amount in the form of cash, then the compensation system may initiate a payment to the vehicle owner, e.g., by submitting a funds transfer request to a banking system at which the vehicle owner maintains an account.

In some example implementations, the compensation system may provide the compensation amount each time it is calculated, e.g., at the end of the coverage period. In other example implementations, the compensation system may accumulate compensation amounts for the vehicle owner until the compensation amount exceeds a predetermined compensation threshold (e.g., $100.00) and provide the accumulated compensation amount at that point. In addition, some implementations of the compensation system may limit the compensation amount to a maximum compensation amount an individual may receive for a given coverage period (e.g., a maximum compensation amount of $500.00 per coverage period). In other example implementations, the compensation system may only provide the compensation amount if the compensation fuel price exceeds the guaranteed fuel price beyond a predetermined percentage threshold (e.g., 5-10%). Utilizing a percentage threshold in this fashion allows an entity to recoup overhead and costs associated with operating the compensation system such that providing compensation due to increases in fuel prices remains cost neutral.

Figure 4:
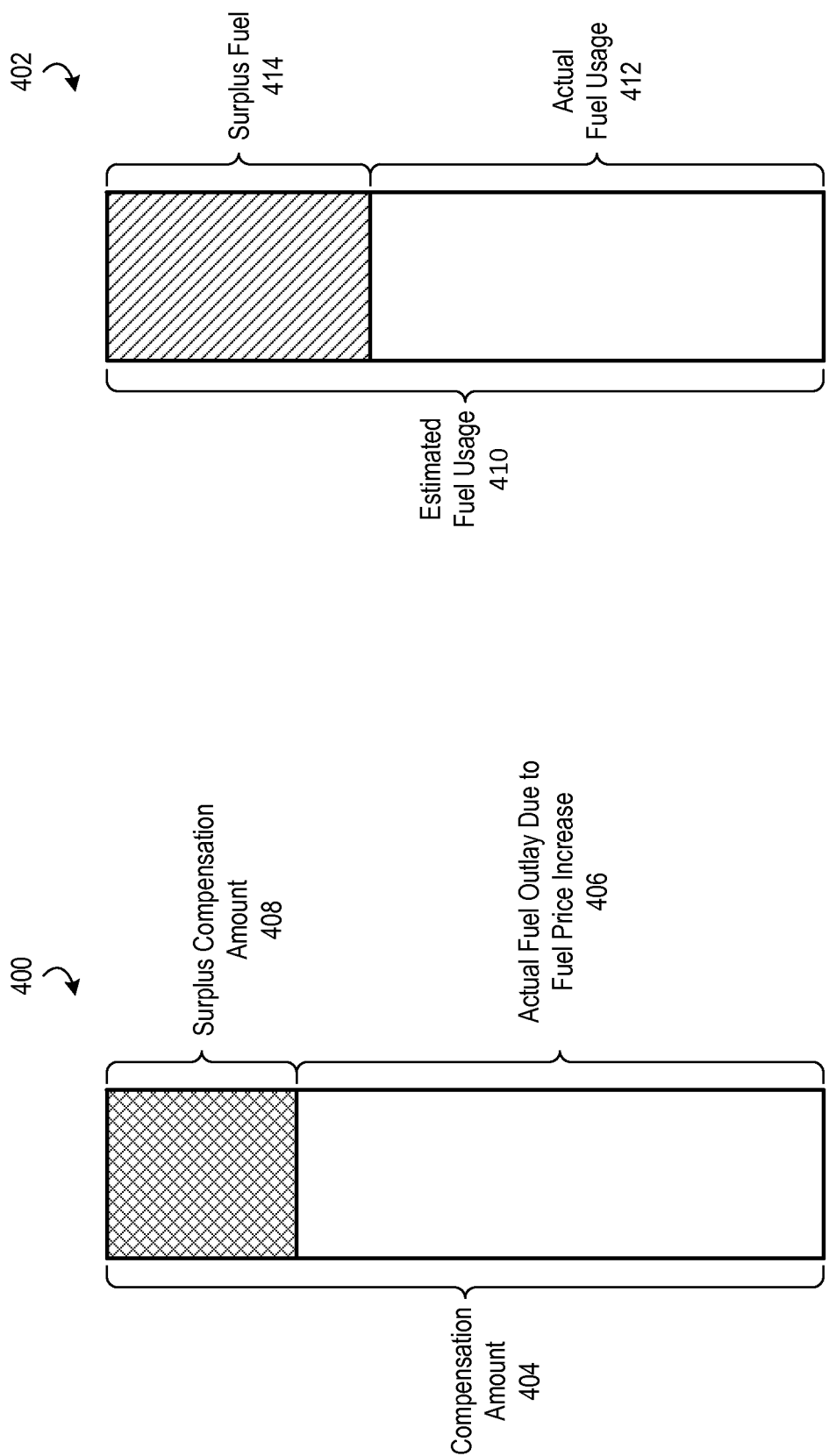
FIG. 4A is an example of an implementation of an indicator that illustrates a surplus compensation amount in accordance with aspects of the present disclosure.
FIG. 4B is an example of an implementation of an indicator that illustrates a surplus fuel amount in accordance with aspects of the present disclosure.

Referring now to FIGS. 4A and 4B, graphical indicators 400 and 402 respectively illustrating a surplus compensation amount and a surplus fuel amount are shown. In FIG. 4A, the indicator 400 is depicted as a bar graph 402 corresponding to the total compensation amount. The bar graph 404 of the indicator 400 is subdivided to identify the portion 406 of the compensation amount that represents the compensation provided for the actual fuel outlay resulting from an increase in a compensation fuel price above the guaranteed fuel price. The bar graph 404 of the indicator 400 also identifies the portion 408 of the compensation amount that represents the surplus compensation earned by improving the actual fuel economy above the estimated fuel economy used to determine the compensation amount.

In FIG. 4B, the indicator 402 is also depicted as a bar graph 410 corresponding to the estimated fuel usage determined for the compensation period based on the total distance units (e.g., miles) traveled during the coverage period and the estimated fuel economy for the vehicle type as described above. The bar graph 410 of the indicator 402 is similarly subdivided to identify a portion 412 corresponding to the actual fuel usage during the coverage period. The bar graph 410 of the indicator 402 also identifies a portion 414 corresponding to the surplus fuel retained by the vehicle by improving the actual fuel economy above the estimated fuel economy for the vehicle.

Figure 5:
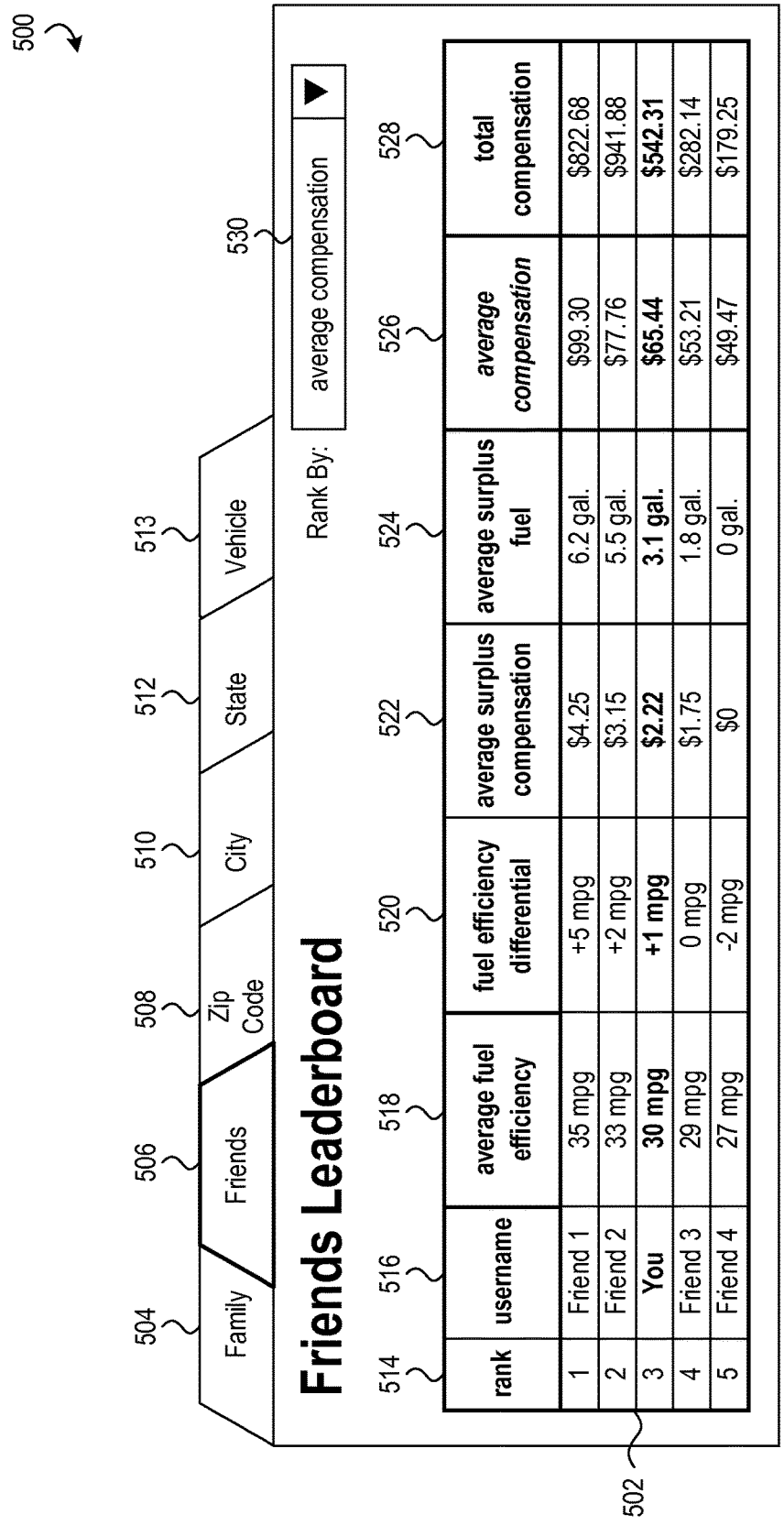
FIG. 5 is an example of an implementation of an interface that includes a leaderboard identifying competitive compensation information for multiple users in accordance with aspects of the present disclosure.

As noted above, a compensation system may include a gamification unit (e.g., gamification unit 128) that gamifies receiving compensation due to increases in fuel prices by providing leaderboards indicating, among other information, the compensation amounts earned by drivers. In FIG. 5, an interface 500 that includes an example of a compensation leaderboard 502 is shown. The interface 500, in this example, includes multiple tabs for selecting various types of leaderboards. The interface 500 includes a tab 504 for viewing a "family" leaderboard that lists compensation information associated with users of a "family" contact list created by the user, a tab 506 for viewing a "friends" leaderboard that lists compensation information associated with users of a "friends" contact list created by the user, a tab 508 for viewing a general "zip code" leaderboard that lists aggregated compensation information associated with users located in respective zip codes, a tab 510 for viewing a general "city" leaderboard that lists aggregated compensation information associated with users located in respective cities, a tab 512 for viewing a general "state" leaderboard that lists aggregated compensation information associated with users located in respective states, and a tab 512 for viewing a "vehicle" leaderboard that lists compensation information respectively associated with users that drive vehicles having the same make, model, year, or combinations thereof.

In FIG. 5, tab 506 has been selected. Accordingly the leaderboard 502 in FIG. 5 is a "friends" leaderboard ranking the respective users included in the "friends" contact list of a user. The leaderboard 502 includes various columns related to the compensation information associated with the users including a column 514 corresponding to the current user rank in the leaderboard, a column 516 corresponding to the username of the user, a column 518 corresponding to the average fuel efficiency achieved by the users, a column 520 corresponding to an average fuel efficiency differential achieved by the users, a column 522 corresponding to the average surplus compensation earned by the users, a column 524 corresponding to the average surplus fuel retained by the users, a column 526 corresponding to an average compensation earned by the users, and a column 528 corresponding to a total compensation amount earned by the users. The compensation information may be associated with a particular coverage period or for all coverage periods to-date. The interface 500 also includes a user input element 530 for changing the ranking criteria of the leaderboard 502. The selections available at the user input element 530 correspond to the columns of the leaderboard. In FIG. 5, the user has selected to rank the users based on the average compensation earned. Accordingly, the leaderboard 502 lists the users in descending order of the average compensation earned.

The interface 500 and leaderboard 502 shown in FIG. 5 is provided by way of example only. Implementations of the compensation system may provide additional and alternative interfaces including additional and alternative tabs or leaderboards. For example, implementations of the compensation system may additionally or alternatively include tabs and leaderboards for schools (e.g., high schools, colleges, universities, and the like), businesses, insurance companies, time zones, age groups (e.g., 16-25 years old, 26-40 years old, 41-60 years old, 61-75 years old, and 76+ years old), national regions (e.g., Northeast, Midwest, South, and West), national divisions (e.g., New England, Mid-Atlantic, East North Central, West North Central, South Atlantic, East South Central, West South Central, Mountain, and Pacific). Furthermore leaderboards may include additional or alternative compensation information including, for example, a maximum fuel efficiency achieved for a coverage period, a maximum fuel efficiency differential achieved for a coverage period, a maximum compensation amount received for a coverage period, a maximum surplus compensation earned for a coverage period, and a maximum amount of surplus fuel retained during a coverage period. Additional examples will be appreciated with the benefit of this disclosure.

Although the approaches described above were described in the context of automobiles, the approaches may be similarly applicable to other types of fuel-consuming vehicles such as boats and planes. Additionally implementations of the compensation system may be configured to compensate individuals for increases in fuel prices based on the actual fuel economy of the vehicle achieved during the coverage period as well as a combination of the actual fuel economy achieved and the estimated fuel economy associated with a vehicle. It will thus be recognized with the benefit of this disclosure that the compensation system described above may be configured to similarly operate using one or more actual fuel economies achieved by the vehicle rather than the estimate fuel economy for the vehicle. As another example, the compensation system may be configured to compensate an individual for increases in fuel prices based on an average of the estimated fuel economy for the vehicle and the average actual fuel economy achieved by the vehicle during the coverage period.

Furthermore the approaches described above may also be applied in the context of other types of energy sources including, for example, ethanol fuel, methanol fuel, hydrogen fuel, compressed natural gas (CNG), liquefied petroleum gas (LPG), and electric energy sources. For electric vehicles that utilize electric power, a miles per gasoline equivalent (MPGe) measure may be utilized in lieu of a fuel economy measure. In addition, instead of a guaranteed fuel price, a guaranteed kilowatt hour (kWh) price may be set for an electric vehicle such that a vehicle owner will be compensated for increases in kWh prices above the guaranteed kWh price during a coverage period. In view of the above, some example implementations of the compensation system may be configured to set multiple guaranteed prices for vehicles that use multiple types of energy sources such as hybrid vehicles and flexible-fuel vehicles. As an example, a compensation system may set a guaranteed fuel price and a guaranteed kWh price for a hybrid vehicle, and the compensation amount provided to the vehicle owner may be based on increases in fuel prices as well as increases in kWh prices during a coverage period.

Aspects of the disclosure have been described in terms of illustrative embodiments thereof. Numerous other embodiments, modifications, and variations will occur to persons of ordinary skill in the art from a review of this disclosure. For example, one of ordinary skill in the art will appreciate that the steps discussed herein may be performed in other than the recited order, and that one or more steps may be optional in accordance with aspects of the disclosure.

What is claimed is:

1. A method comprising:
storing, by a compensation system, a first fuel price;
receiving, via a wireless network and at the compensation system from an on-board telematics device of a vehicle, telematics information collected by the on-board telematics device during an operation of the vehicle in a first time period, wherein the telematics information comprises a total number of distance units traveled by the vehicle during the first time period;
determining, by the compensation system, that a second fuel price for the first time period is higher than the first fuel price;
determining, by the compensation system, an estimated fuel economy based on a vehicle type of the vehicle;
in response to the second fuel price being higher than the first fuel price, determining, by the compensation system, a compensation amount based at least on a difference between the first fuel price and the second fuel price, the total number of distance units traveled, and the estimated fuel economy; and
initiating, by the compensation system, an electronic payment to a financial account of an individual associated with the vehicle, wherein the electronic payment is based on the compensation amount.

2. The method of claim 1, further comprising:
determining, by the compensation system, a third fuel price for a second time period that precedes the first time period; and
determining, by the compensation system, the first fuel price based on the third fuel price.

3. The method of claim 2, wherein:
determining the third fuel price for the first time period comprises determining an average fuel amount for the first time period within a geographic area associated with the vehicle.

4. The method of claim 3, wherein:
the geographic area associated with the vehicle comprises an area defined by a zip code in which the vehicle is registered.

5. The method of claim 1, wherein:
the telematics information further comprises an actual fuel economy achieved by the vehicle during the first time period, wherein the compensation amount is further determined based on the actual fuel economy.

6. The method of claim 5, further comprising:
determining, by the compensation system, an average actual fuel economy of the vehicle for the first time period, wherein the compensation amount is determined based on the average actual fuel economy.

7. The method of claim 6, wherein the average actual fuel economy is higher than the estimated fuel economy, wherein a portion of the compensation amount that corresponds to a surplus compensation amount is determined based at least on (i) the difference between the first fuel price and the second fuel price, (ii) the total number of distance units traveled, and (iii) a difference between the estimated fuel economy and the average actual fuel economy, and wherein the method further comprises:
transmitting, by the compensation system to a computing device of an individual associated with the vehicle, a notification comprising an indication of the surplus compensation amount.

8. The method of claim 1 wherein:
the telematics information further comprises a plurality of vehicle operation scores;
each of a plurality of portions of the total number of distance units traveled is associated with one of the plurality of vehicle operation scores; and
determining the compensation amount comprises determining the compensation amount based at least on only those portions of the total number of distance units traveled that are associated with an operation score above a predetermined vehicle operation score threshold.

9. The method of claim 1 wherein:
the total number of distance units traveled is a total number of miles driven;
the estimated fuel economy comprises an estimated urban fuel economy and an estimated highway fuel economy; and
determining the compensation amount further comprises:
determining an urban usage percentage and a highway usage percentage associated with the vehicle,
determining a total number of urban miles driven based on the urban usage percentage and the total number of miles driven,
determining a total number of highway miles driven based on the highway usage percentage and the total number of miles driven, and
determining the compensation amount further based on:
(i) the total number of urban miles driven and the estimated urban fuel economy, and
(ii) the total number of highway miles driven and the estimated highway fuel economy.

10. The method of claim 1 wherein:
the estimated fuel economy is determined based on one or more actual fuel economies received from one or more other vehicles having the same vehicle type as the vehicle.

11. The method of claim 1 wherein:
the total number of distance units traveled is an aggregate number of distance units traveled by the vehicle for a plurality of trips taken by the vehicle during the first time period.

12. A compensation system comprising:
one or more processors; and
memory storing instructions that, when executed by at least one of the one or more processors, cause the compensation system to:
store, at a data store, a first fuel price,
receive, via a wireless network and from an on-board telematics device of a vehicle, telematics information, wherein the telematics information comprises a total number of distance units traveled by the vehicle during a first time period,
determine that a second fuel price for the first time period is higher than the first fuel price,
determine an estimated fuel economy based on a vehicle type of the vehicle, and
in response to the second fuel price being higher than the first fuel price, determine a compensation amount based at least on a difference between the first fuel price and the second fuel price, the total number of distance units traveled, and the estimated fuel economy; and
initiate an electronic payment, wherein the electronic payment is based on the compensation amount.

13. The compensation system of claim 12 wherein:
the instructions, when executed by the one or more processors, further cause the compensation system to:
determine a third fuel price for a second time period that precedes the first time period, and
determine the first fuel price based on the third fuel price.

14. The compensation system of claim 13 wherein:
the third fuel price is an average fuel price associated with a geographic area.

15. The compensation system of claim 12 wherein:
the instructions, when executed by the one or more processors, further cause the compensation system to:
transmit a notification to a computing device of an individual associated with the vehicle, wherein the notification includes an indication of the compensation amount and options for accepting delivery of the compensation amount,
receive a response from the computing device, wherein the response includes an indication of one of the options selected at the computing device, and
initiate delivery of the compensation amount based on the one of the options selected.

16. The compensation system of claim 15 wherein:
the instructions, when executed by the one or more processors, further cause the compensation system to double the compensation amount responsive to determining that the one of the options selected is a credit toward a premium of an insurance policy.

17. The compensation system of claim 12 wherein:
the total number of distance units traveled is a total number of miles driven;
the estimated fuel economy comprises an estimated urban fuel economy and an estimated highway fuel economy; and
the instructions, when executed by the one or more processors, further cause the compensation system to:
determine an urban usage percentage and a highway usage percentage associated with the vehicle,
determine a total number of urban miles driven based on the urban usage percentage and the total number of miles driven,
determine a total number of highway miles driven based on the highway usage percentage and the total number of miles driven, and determine the compensation amount further based on:
  i) the total number of urban miles driven and the estimated urban fuel economy, and
  ii) the total number of highway miles driven and the estimated highway fuel economy.

18. The compensation system of claim 12 wherein:
the instructions, when executed by the one or more processors, further cause the compensation system to adjust the estimated fuel economy based on an analysis of at least a portion of the telematics information received from the on-board telematics device.

* * * * *